(12) United States Patent
Bertram et al.

(10) Patent No.: US 9,623,881 B2
(45) Date of Patent: Apr. 18, 2017

(54) VALVE INTERLOCK SYSTEMS FOR USE WITH RAILCARS

(71) Applicant: American Railcar Industries, Inc., St. Charles, MO (US)

(72) Inventors: Gregory Bertram, Valmeyer, IL (US); Ben Miller, Fort Worth, TX (US); Justin Dobsch, Hawk Point, MO (US); Roger Dalske, Florissant, MO (US)

(73) Assignee: American Railcar Industries, Inc., St. Charles, MO (US)

( * ) Notice: Subject to any disclaimer, the term of this patent is extended or adjusted under 35 U.S.C. 154(b) by 407 days.

(21) Appl. No.: 14/497,632

(22) Filed: Sep. 26, 2014

(65) Prior Publication Data

US 2015/0090150 A1 Apr. 2, 2015

Related U.S. Application Data

(60) Provisional application No. 61/883,586, filed on Sep. 27, 2013.

(51) Int. Cl.
| | |
|---|---|
| *B61D 5/00* | (2006.01) |
| *B60P 3/22* | (2006.01) |
| *B65D 90/00* | (2006.01) |
| *F16K 35/10* | (2006.01) |
| *F16K 27/07* | (2006.01) |

(52) U.S. Cl.
CPC .............. *B61D 5/00* (2013.01); *B60P 3/2205* (2013.01); *B61D 5/08* (2013.01); *F16K 27/07* (2013.01); *F16K 35/10* (2013.01); *Y10T 137/6866* (2015.04)

(58) Field of Classification Search
CPC .......... B61D 5/00; B61D 5/002; B61D 5/004; B61D 5/006; B61D 5/008; B61D 5/02; B61D 5/04; B61D 5/06; B61D 5/08; F16K 27/07; F16K 27/105; F16K 27/102; F16K 35/10
See application file for complete search history.

(56) References Cited

U.S. PATENT DOCUMENTS 1,227,096 A * 5/1917 Vincent .................. F01B 25/00
137/346
1,369,111 A 2/1921 Jacobs et al.
(Continued)

*Primary Examiner* — Jason C Smith
(74) *Attorney, Agent, or Firm* — Armstrong Teasdale LLP

(57) ABSTRACT

A valve interlock system for a railcar including a valve stem locking subsystem that includes a coupling device rotatably coupled to the valve stem. The coupling device is substantially stationary in the longitudinal direction and rotatably translatable about a longitudinal axis and defines an engagement slot thereon. The subsystem also includes a stationary support member extending toward the coupling device in a transverse direction perpendicular to the longitudinal direction and includes a locking member that is transversely translatable and complimentary with the engagement slot. The subsystem also includes a biasing device coupled to the locking member that increases an engagement bias as the locking member is transversely translated away from the engagement slot. The subsystem further includes a valve operator assembly that includes a longitudinally and rotatably translatable body configured to regulate the slot engagement bias as a function of a longitudinal position of the body.

20 Claims, 21 Drawing Sheets

(56) References Cited

U.S. PATENT DOCUMENTS

| | | | | |
|---|---|---|---|---|
| 3,227,101 | A | | 1/1966 | Holden, Jr. |
| 3,406,700 | A | * | 10/1968 | Beazer ................... F16K 27/07 137/39 |
| 4,220,097 | A | | 9/1980 | Wempe et al. |
| 4,397,444 | A | * | 8/1983 | Behle ...................... F16K 27/07 251/144 |
| 4,422,473 | A | * | 12/1983 | Polley ................. F16K 11/0873 137/625.32 |
| 4,495,963 | A | * | 1/1985 | Hensley ............. F01M 11/0408 137/351 |
| 4,527,489 | A | * | 7/1985 | Schlink .................... B61D 5/08 105/358 |
| 4,678,159 | A | * | 7/1987 | Gardner ................. F16K 27/07 251/101 |
| 4,941,410 | A | * | 7/1990 | Dalrymple ............... B61D 5/08 105/358 |
| 6,213,449 | B1 | * | 4/2001 | Portis ..................... B60P 3/224 137/347 |
| 6,941,873 | B1 | * | 9/2005 | Holmgren ................ B08B 9/08 105/358 |
| 2014/0261072 | A1 | * | 9/2014 | Thompson ............... G05G 1/08 105/358 |
| 2015/0336590 | A1 | * | 11/2015 | Saxton .................. B61D 5/008 137/350 |

* cited by examiner

VALVE INTERLOCK SYSTEMS FOR USE WITH RAILCARS

CROSS REFERENCE TO RELATED APPLICATIONS

This application claims the priority of Provisional Patent Application Ser. No. 61/887,626, entitled "DOOR AND DOOR OPERATING ASSEMBLY FOR A RAILCAR AND METHOD OF ASSEMBLING THE SAME", which was filed on Oct. 7, 2013, and which is hereby incorporated by reference in its entirety.

BACKGROUND

The present disclosure relates generally to railway cars and related components, and more particularly to a valve interlock system for a railway car.

The transportation industry transports a variety of products, including hazardous products, in many different types of transportation vehicles. For example, fuel, gas, and/or other hazardous chemicals are contained in tanker vehicles such as over-the-road trucks and railcars. Products contained in railcars including tanker cars may be released from the railcars using outlet valves including, for example, outlet ball valves. Known outlet valves may be operated using a valve operator configured to rotate the valve to an open or closed position. The outlet valve is normally in flow communication with discharge piping that transports the products from the railcar. When the railcar enters a receiving depot, the discharge piping is connected to receiving piping which can receive products contained in railway cars and transport such products to receptacles. As outlet valves are rotated between an open and/or a closed position using a valve operator, the outlet valves may be able to release products to, for example, the discharge piping. In alternative situations, the outlet valves may be able to release products to the ground underneath the railcar. Known products contained within railcars, including tanker cars, may be undesirable to release unintentionally. As a result, when valves including outlet valves are rotated to a partially or fully open position, products may drop from a railcar unintentionally while the railcar is stationary or in motion. If a valve operator is connected to the valve, the valve may be opened by outside forces. For example, extended and/or high vibrations and jarring events such as coupling and uncoupling of cars may cause the valve to be opened by a valve operator and accordingly such an opening of the valve may cause products to be released. Additionally, when a railcar has released a majority of its product from the tanker, it may still contain at least some residue. Accordingly, an open or partially open valve may result in residual product dropping from a railcar that is substantially emptied. In at least some cases, remediation related to the released product may be required.

Accordingly, a method of controlling the release of products, and more specifically, preventing outlet valves from remaining unintentionally partially or fully open is desirable when the valve operator has been disengaged. Specifically, a valve interlock system is needed such that the valve interlock prevents a valve operator from being removed from the outlet valve assembly while the outlet valve is in a partially or fully opened state.

BRIEF DESCRIPTION

In one aspect, a valve interlock system for use in a railcar is provided. The railcar includes a tank and a bottom outlet valve assembly coupled in flow communication with the tank. The tank substantially defines a tank cavity. The bottom outlet valve assembly is configured to release product from the tank cavity. The bottom outlet valve assembly includes a valve and a valve stem coupled to the valve and extends longitudinally therefrom. The valve interlock system includes a valve stem locking subsystem that includes a coupling device rotatably coupled to the valve stem. The coupling device defines an engagement slot thereon and the coupling device is substantially stationary in the longitudinal direction and rotatably translatable about a longitudinal axis. The valve stem locking subsystem also includes a stationary support member extending toward the valve stem coupling device in a transverse direction that is substantially perpendicular to the longitudinal direction. The stationary support member defines a cavity proximate the coupling device. The valve stem locking subsystem further includes a locking member at least partially positioned within the cavity. The locking member is transversely translatable and complimentary with the engagement slot. The valve stem locking subsystem also includes a biasing device at least partially positioned within the cavity. The biasing device is coupled to the locking member and configured to increase an engagement bias as the locking member is transversely translated away from the engagement slot. The valve stem locking subsystem further includes a valve operator assembly configured to rotate the coupling device and the valve stem to open and close the valve. The valve operator assembly includes a longitudinally and rotatably translatable body configured to regulate the slot engagement bias as a function of a longitudinal position of the body.

In another aspect, a valve interlock system for use in a railcar is provided. The railcar includes a tank and a bottom outlet valve assembly coupled in flow communication with the tank. The tank substantially defines a tank cavity. The bottom outlet valve assembly is configured to release product from the tank cavity. The bottom outlet valve assembly including a valve and a valve stem coupled to the valve and extending longitudinally therefrom. The valve interlock system includes a valve stem rotation restriction subsystem including a longitudinally and rotatably translatable body including an outer surface extending about a longitudinal axis and a rotation restriction device coupled to and extending transversely from the outer surface. The valve stem rotation restriction subsystem also includes a collar partially extending about the body. The collar and the rotation restriction device are configured to permit longitudinal translation of the body only while the bottom outlet valve is in a substantially closed position and allow rotational translation of the body only while the body is substantially fully inserted longitudinally.

In a further aspect, a railcar is provided. The railcar includes a tank substantially defining a tank cavity and a bottom outlet valve assembly coupled in flow communication to the tank. The bottom outlet valve assembly is configured to release product from the tank cavity. The bottom outlet valve assembly includes a valve and a valve stem coupled to the valve and extending longitudinally therefrom. The railcar also includes a valve interlock system including a valve stem locking subsystem that includes a coupling device rotatably coupled to the valve stem. The coupling device defines an engagement slot thereon and the coupling device is substantially stationary in the longitudinal direction and rotatably translatable about a longitudinal axis. The valve stem locking subsystem also includes a stationary support member extending toward the valve stem coupling device in a transverse direction substantially perpendicular to the longitudinal direction. The stationary support member defines a cavity proximate the coupling device. The valve stem locking subsystem further includes a locking member at least partially positioned within the cavity. The locking member is transversely translatable and complimentary with the engagement slot. The valve stem locking subsystem also includes a biasing device at least partially positioned within the cavity. The biasing device is coupled to the locking member and is configured to increase an engagement bias as the locking member is transversely translated away from the engagement slot. The valve stem locking subsystem further includes a valve operator assembly configured to rotate the coupling device and the valve stem to open and close the valve. The valve operator assembly includes a longitudinally and rotatably translatable body configured to regulate the slot engagement bias as a function of a longitudinal position of the body.

DRAWINGS

FIG. 1 is a schematic side view of an example railcar;

FIG. 2 is a schematic lateral view of an example outlet valve assembly used in the railcar shown in FIG. 1;

FIG. 3 is a schematic overhead view of an example valve interlock system used with the bottom outlet valve assembly shown in FIG. 2;

FIG. 4 is a schematic bottom view of the valve interlock system shown in FIG. 3;

FIG. 5 is a schematic bottom perspective view of the valve interlock system shown in FIG. 3;

FIG. 6 is a schematic view of an example valve stem locking subsystem and an example valve stem rotation restriction subsystem that may be used with the valve interlock system shown in FIGS. 3-5, the valve stem locking subsystem in a fully engaged state and the valve stem rotation restriction subsystem in a rotation restrictive state;

FIG. 7 is a schematic view of the valve stem locking subsystem and the valve stem rotation restriction subsystem shown in FIG. 6, the valve stem locking subsystem in a partially disengaged state and the valve stem rotation restriction subsystem in a rotation restrictive state transiting to a nonrestrictive state;

FIG. 8 is a schematic view of the valve stem locking subsystem and the valve stem rotation restriction subsystem shown in FIGS. 6 and 7, the valve stem locking subsystem in a fully disengaged state and the valve stem rotation restriction subsystem in a rotation nonrestrictive state;

FIG. 9 is a schematic view of the valve stem locking subsystem and the valve stem rotation restriction subsystem shown in FIGS. 6-8, the valve stem locking subsystem in a fully disengaged state and the valve stem rotation restriction subsystem in a rotation nonrestrictive state with the outlet valve assembly shown in FIG. 2 turned 90 degrees;

FIG. 10 is a schematic view of a valve handle locking bracket that may be used with the valve interlock systems shown in FIGS. 4 and 5;

FIG. 11 is a schematic overhead perspective view of another example valve interlock system used with the bottom outlet valve assembly shown in FIG. 2 in a disengaged position;

FIG. 12 is a schematic overhead perspective view of the valve interlock system shown in FIG. 11, used with the bottom outlet valve assembly shown in FIG. 2 in an engaged position;

FIG. 13 is a schematic lateral side view of a portion of the example valve interlock bracket shown in FIGS. 11 and 12 illustrating an example bracket collar and further showing a portion of the valve interlock system shown in FIG. 11, used with the bottom outlet valve assembly shown in FIG. 2 in a first, i.e., closed position;

FIG. 14 is a schematic lateral side view of a portion of the example valve interlock bracket shown in FIGS. 11 and 12 illustrating an example bracket collar and further showing a portion of the valve interlock system shown in FIG. 11, used with the bottom outlet valve assembly shown in FIG. 2 in a second, i.e., open position;

FIG. 15 is a schematic lateral side view of a portion of the valve operator assembly taken along line 15-15 shown in FIGS. 11 and 12;

FIG. 16 is a schematic lateral overhead view of an example engagement locking mechanism shown in FIGS. 11 and 12;

FIG. 17 is a schematic overhead view of an alternative valve interlock system used with the bottom outlet valve assembly shown in FIG. 2;

FIG. 18 is a schematic bottom view of the valve interlock system shown in FIG. 17;

FIG. 19 is a schematic view of an example valve stem locking subsystem and an example valve stem rotation restriction subsystem that may be used with the valve interlock system shown in FIGS. 18-19, the valve stem locking subsystem in a fully engaged state and the valve stem rotation restriction subsystem in a rotation restrictive state;

FIG. 20 is a schematic view of the valve stem locking subsystem and the valve stem rotation restriction subsystem shown in FIG. 19, the valve stem locking subsystem in a partially disengaged state and the valve stem rotation restriction subsystem in a rotation restrictive state transiting to a nonrestrictive state;

Figure 2:
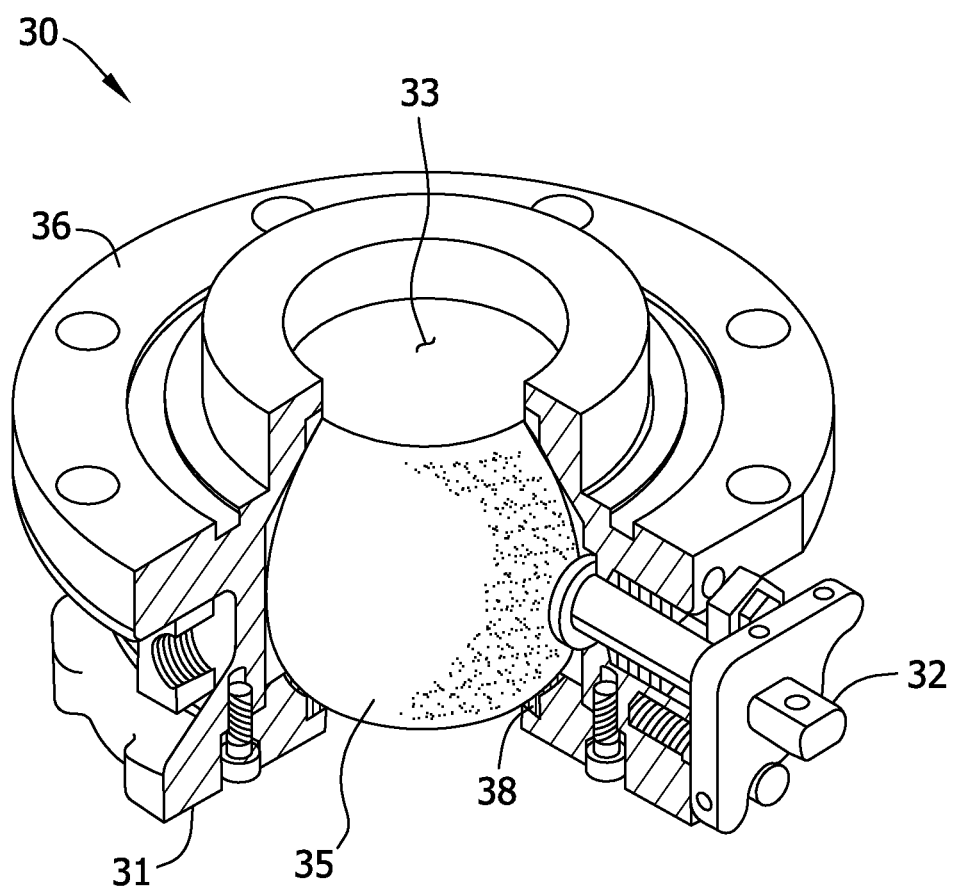
Figure 19:
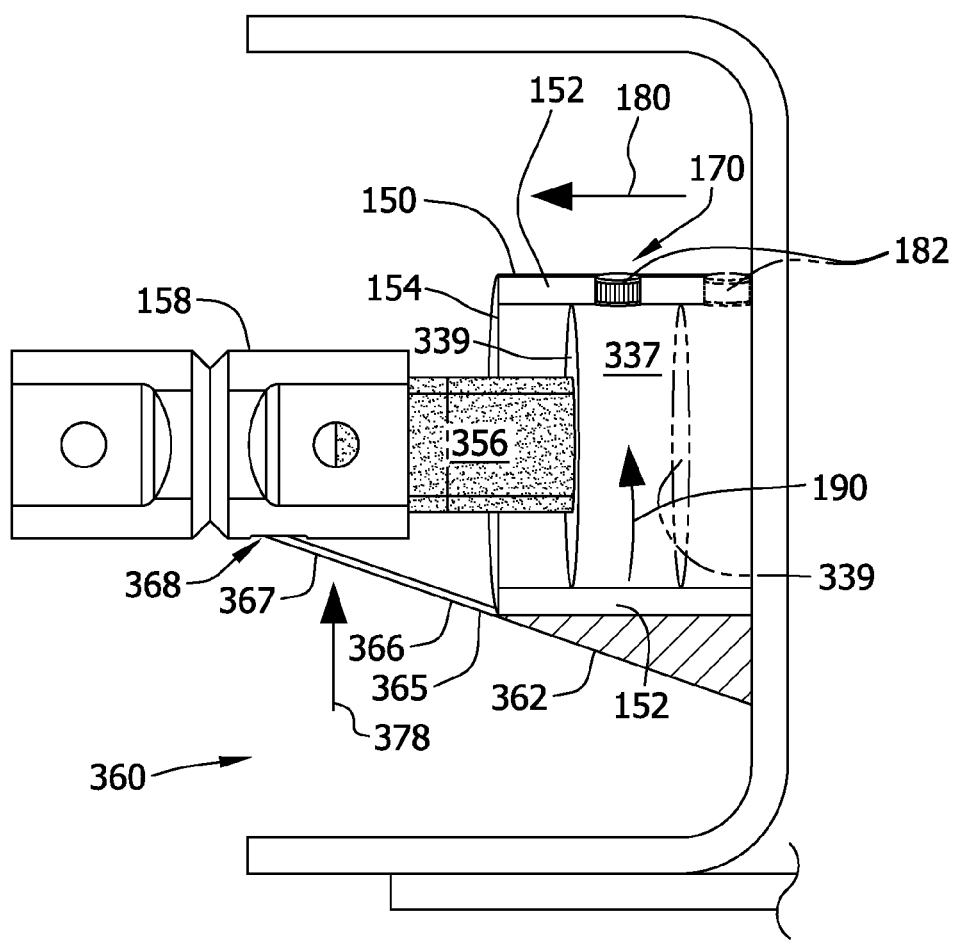
Figure 20:
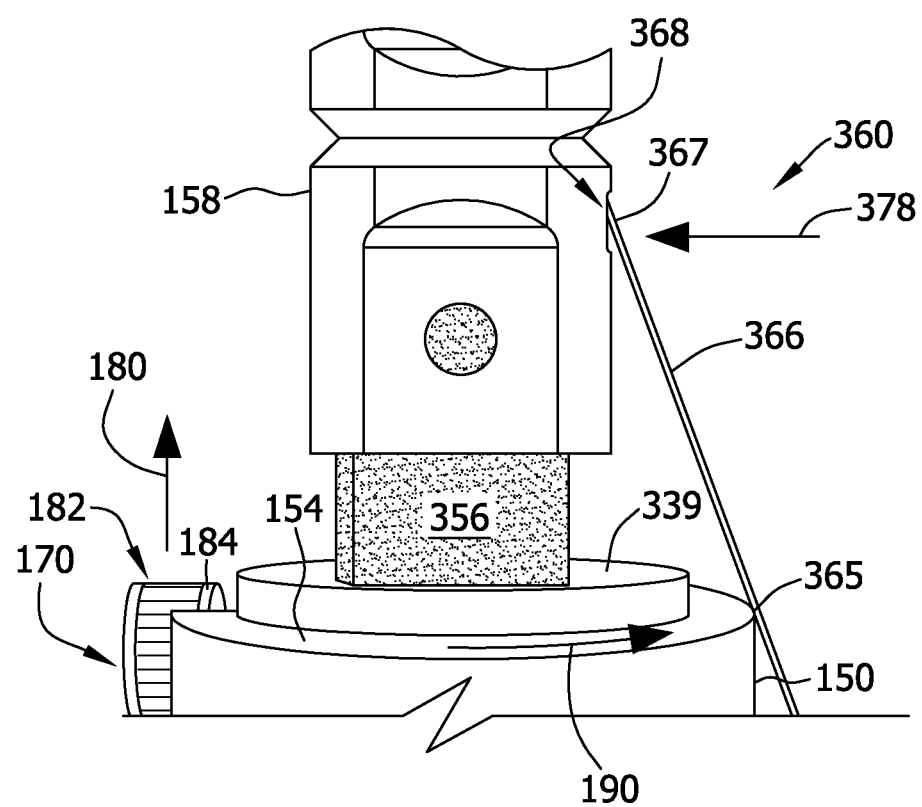
Figure 21:
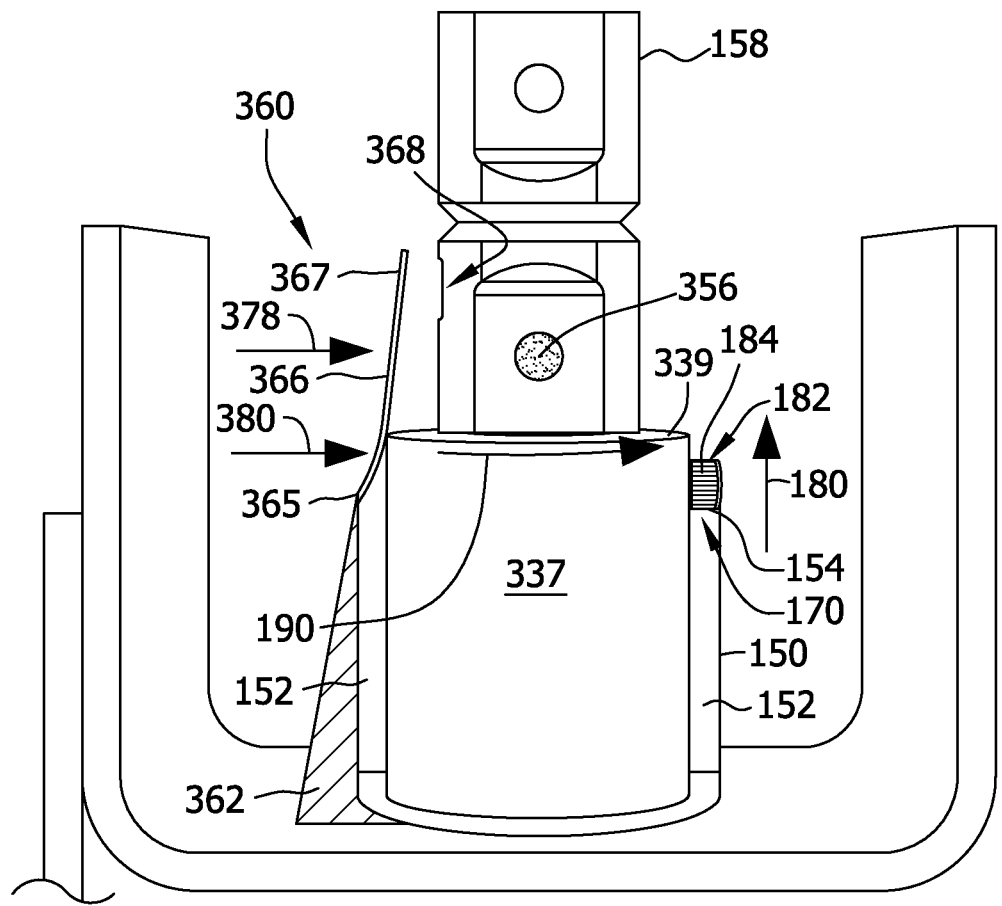
Figure 22:
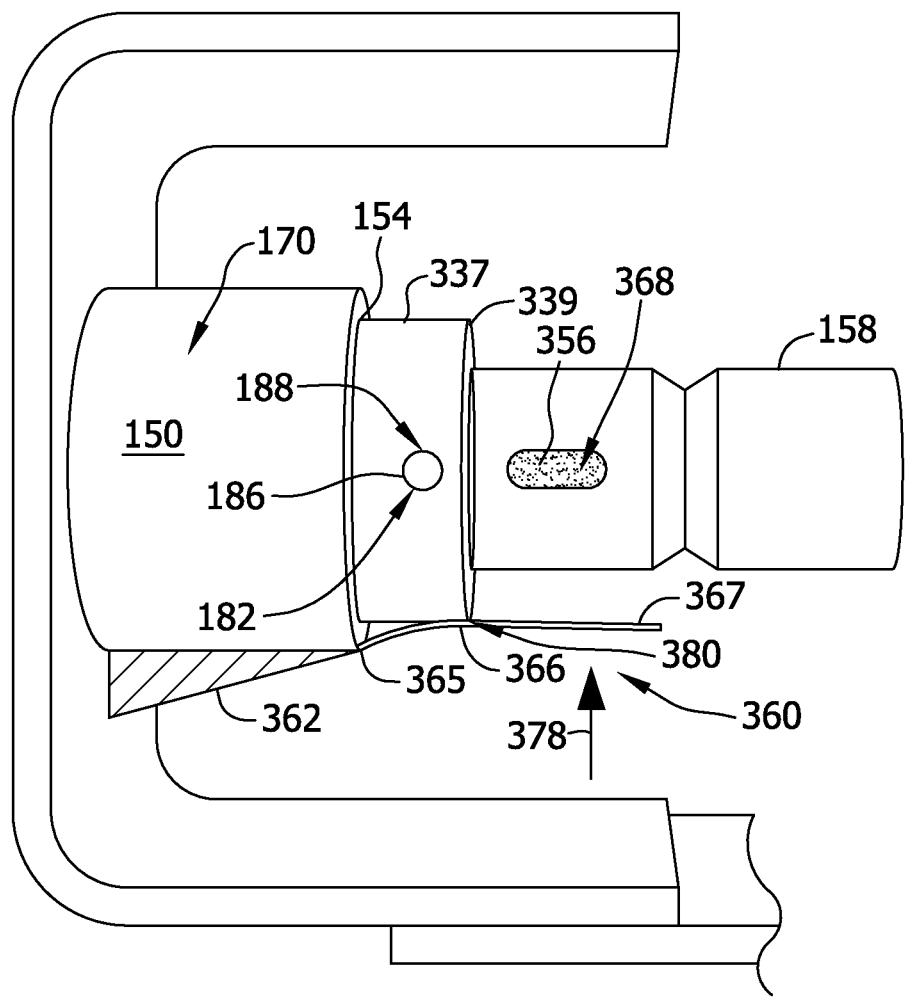

FIG. 21 is a schematic view of the valve stem locking subsystem and the valve stem rotation restriction subsystem shown in FIGS. 19 and 20, the valve stem locking subsystem in a fully disengaged state and the valve stem rotation restriction subsystem in a rotation nonrestrictive state; and FIG. 22 is a schematic view of the valve stem locking subsystem and the valve stem rotation restriction subsystem shown in FIGS. 19-21, the valve stem locking subsystem in a fully disengaged state and the valve stem rotation restriction subsystem in a rotation nonrestrictive state with the outlet valve assembly shown in FIG. 2 turned 90 degrees.

DETAILED DESCRIPTION

The example methods and apparatus described herein overcome at least some disadvantages of known railcars by providing a valve interlock assembly to reduce the risk of the unintentional release of products from a railway tanker car. Specifically, the methods and apparatus described herein facilitate removal of a valve operator from a valve when the valve is in a closed position and also facilitate convenient stowing of the operator. The methods and apparatus described herein also facilitate a reduction in the cleaning, maintenance, and remediation associated with the unintended release of such products. The methods and apparatus described herein additionally reduce the risk of loss of such products during transit.

Figure 1:
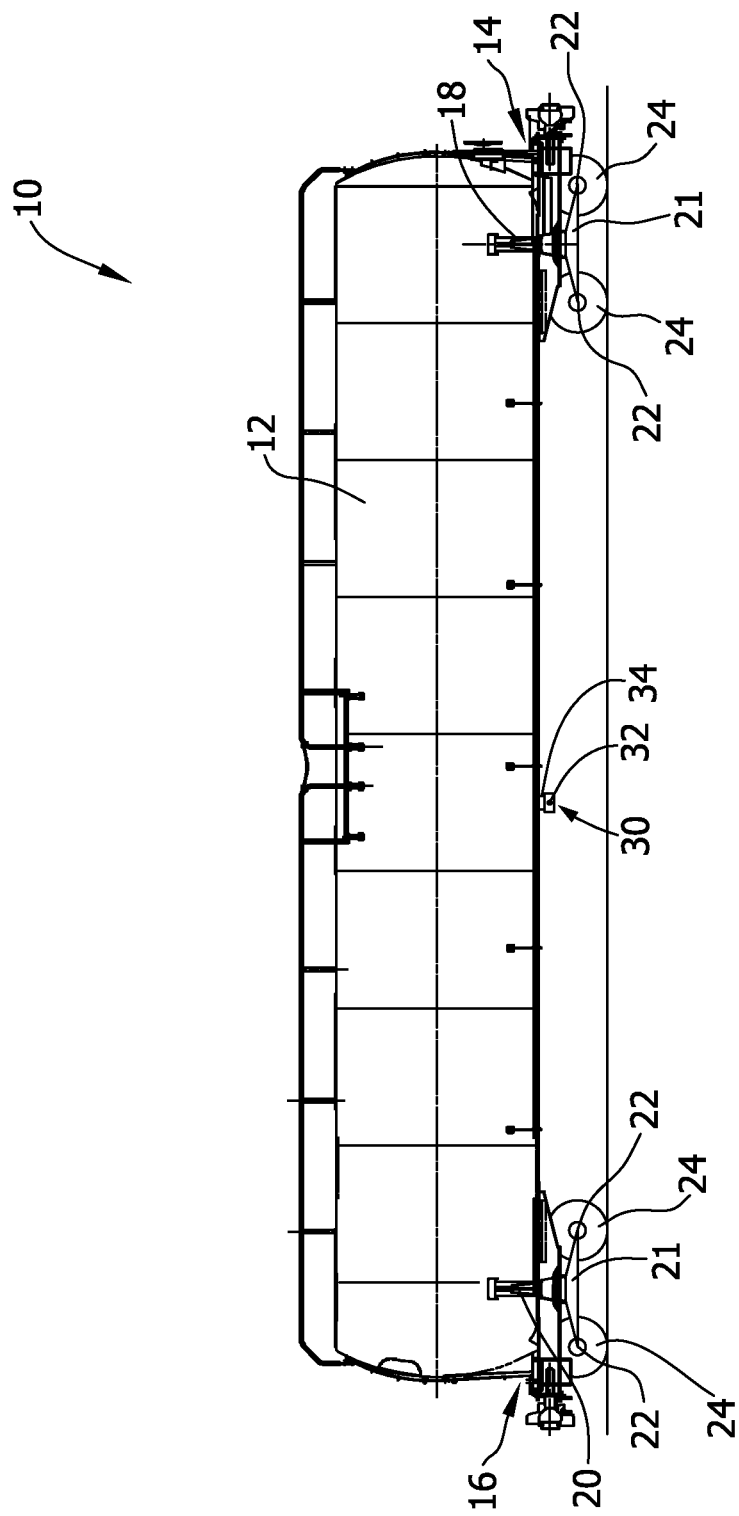
FIGS. 1-22 show example embodiments of the apparatus described herein.

FIG. 1 is a side view of an example railcar 10. In the example embodiment, railcar 10 is a tanker railcar. Alternately, railcar 10 may be any type of railcar capable of using the apparatus described herein including, without limitation, non-pressure and pressure cars. Tanker railcar 10 is used to store and/or transported materials, such as liquids and gases such as ethanol and crude oil. Tanker railcar 10 includes a tank 12, a front sill assembly 14, and a rear sill assembly 16. Tank 12 further defines a cavity (not shown) containing transported materials. Sill assemblies 14 and 16 are coupled to tank 12. Bolster assemblies 18 and 20 are configured to stabilize tank 12 on sill assemblies 14 and 16. More specifically, front bolster assembly 18 is coupled to tank 12 and front sill assembly 14, and rear bolster assembly 20 is coupled to tank 12 and rear sill assembly 16. Truck 21 having a pair of axles 22 each coupled to a pair of wheels 24 is coupled to each of sill assemblies 14 and 16.

Tanker railcar 10 also includes a bottom outlet valve assembly, i.e., a ball valve assembly 30. Bottom outlet valve assembly 30 includes a valve stem 32 such that bottom outlet valve assembly 30 is opened and closed by rotating the associated valve stem 32. A typical range of travel of valve stem 32 is ninety degrees. When valve stem 32 is turned to open bottom outlet valve assembly 30, products may be evacuated from tank 12 at outlet port 34. As described herein, some known bottom outlet valve assemblies 30 may be opened to a partially opened state by partially turning valve stem 32 from a closed position to a slightly open position. As used herein, a closed position is a position which causes bottom outlet valve assembly 30 to substantially prevent material from leaving tank 12 through outlet port 34. In such cases where valve stem 32 is in a slightly open position, products may slowly evacuate or leak through outlet port 34. In the example embodiment, tanker railcar 10 includes one bottom outlet valve assembly 30. In alternative embodiments, tanker railcar 10 may include any number of bottom outlet valve assemblies 30. In the example embodiment, valve stem 32 is located underneath tanker railcar 10. In alternative embodiments, valve stem 32 may be located on other portions of tanker railcar 10.

To manufacture tanker railcar 10, bolster assemblies 18 and 20, and sill assemblies 14 and 16 are assembled. More specifically, bolster assemblies 18 and 20 and sill assemblies 14 and 16 are welded to tank 12. Outlet port 34 is opened in tanker railcar 10. Bottom outlet valve assembly 30 is assembled and coupled to tank 12 over outlet port 34. Bolster assemblies 18 and 20 and sill assemblies 14 and 16 are then rested on trucks 21.

FIG. 2 is a schematic lateral view of an example outlet valve assembly 30 used in railcar 10 (shown in FIG. 1). Outlet valve assembly 30 is in material flow communication with products passing through tank 12 (shown in FIG. 1) and into outlet port 34 (shown in FIG. 1). In the example embodiment, outlet valve assembly 30 is a ball valve assembly. In alternative embodiments, outlet valve assembly 30 may be any outlet valve assembly including, without limitation, a plug valve assembly, a gate valve assembly, and a butterfly valve assembly. Outlet valve assembly 30 includes a body 31 that defines a cavity (not shown) therein. A ball 35 is positioned within the cavity and defines a substantially cylindrical passage 33. In the example embodiment, passage 33 is approximately four inches in diameter. Alternately, passage 33 has any diameter. Ball 35 is movable within the cavity between a first, i.e., closed position limiting material flow through passage 33 and a second, i.e., open position allowing material flow through the cavity. Ball 35 may be moved between the closed position and the open position through the rotation of valve stem 32. In the example embodiment, stem 32 and ball 35 rotate approximately ninety degrees to change from the first position to the second position and back. In a particular embodiment, outlet valve assembly 30 includes a resilient seal 38 that compresses with ball 35 in the closed position to provide a seal about a periphery of ball 35. Outlet valve assembly 30 also includes tank coupling flange 36. Tank coupling flange 36 is used to couple outlet valve assembly 30 to a portion of tank 12. In the example embodiment shown in FIG. 1, tank coupling flange 36 is coupled to a central bottom portion of tank 12 through mechanical fasteners (not shown). In alternative embodiments, tank coupling flange 36 may be coupled to tank 12 using any appropriate method of coupling.

Figure 3:
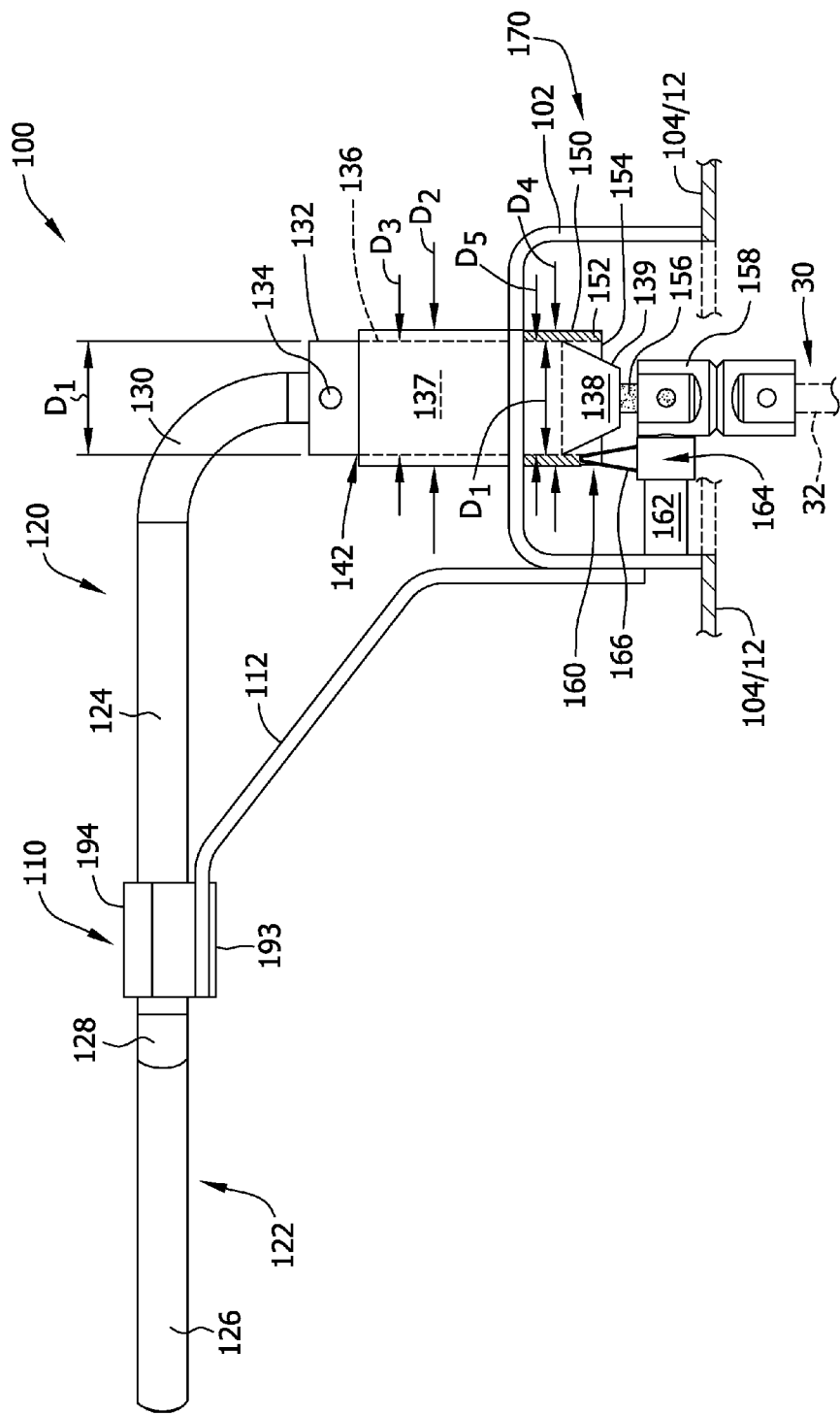
Figure 4:
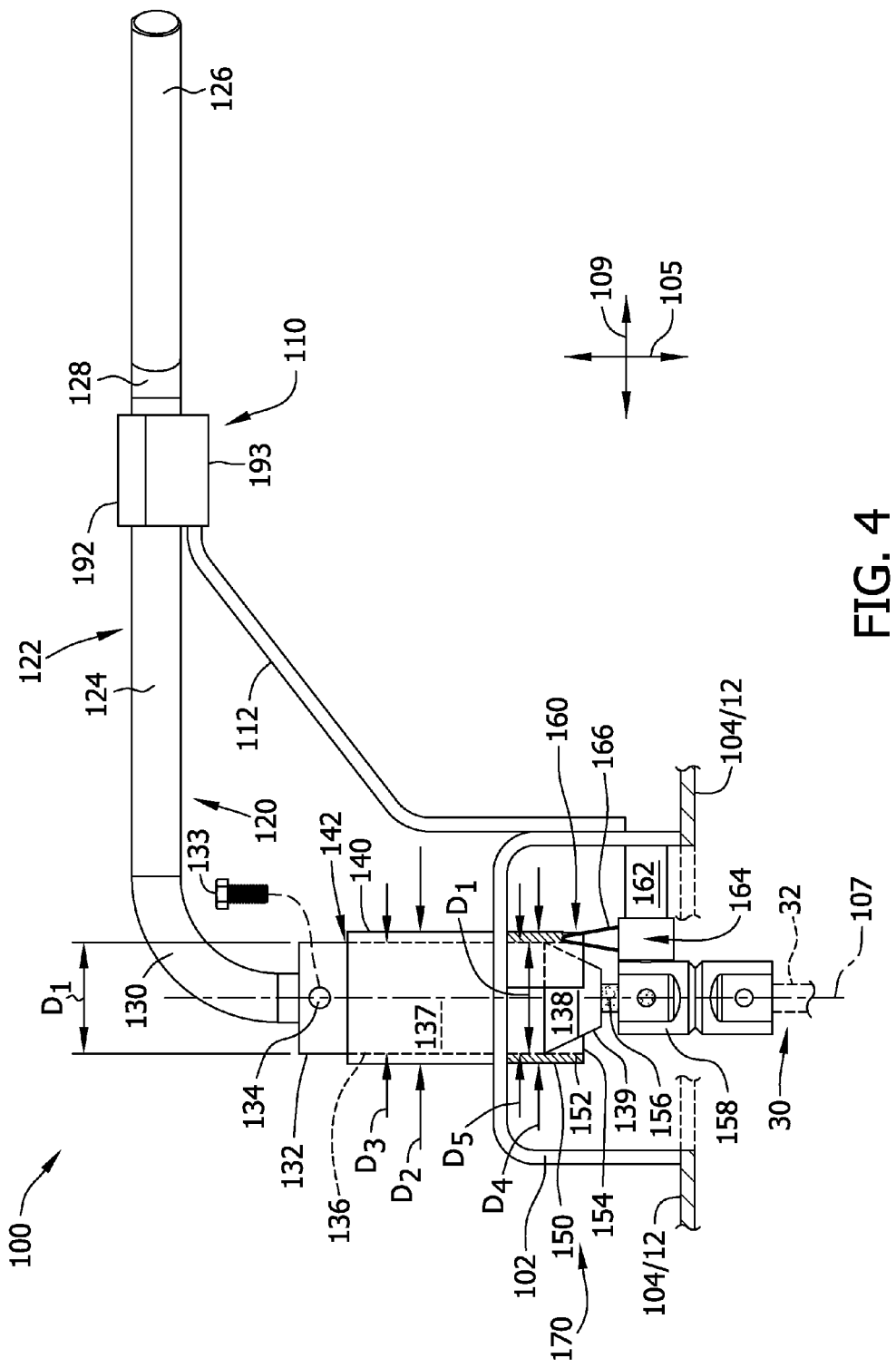
Figure 5:
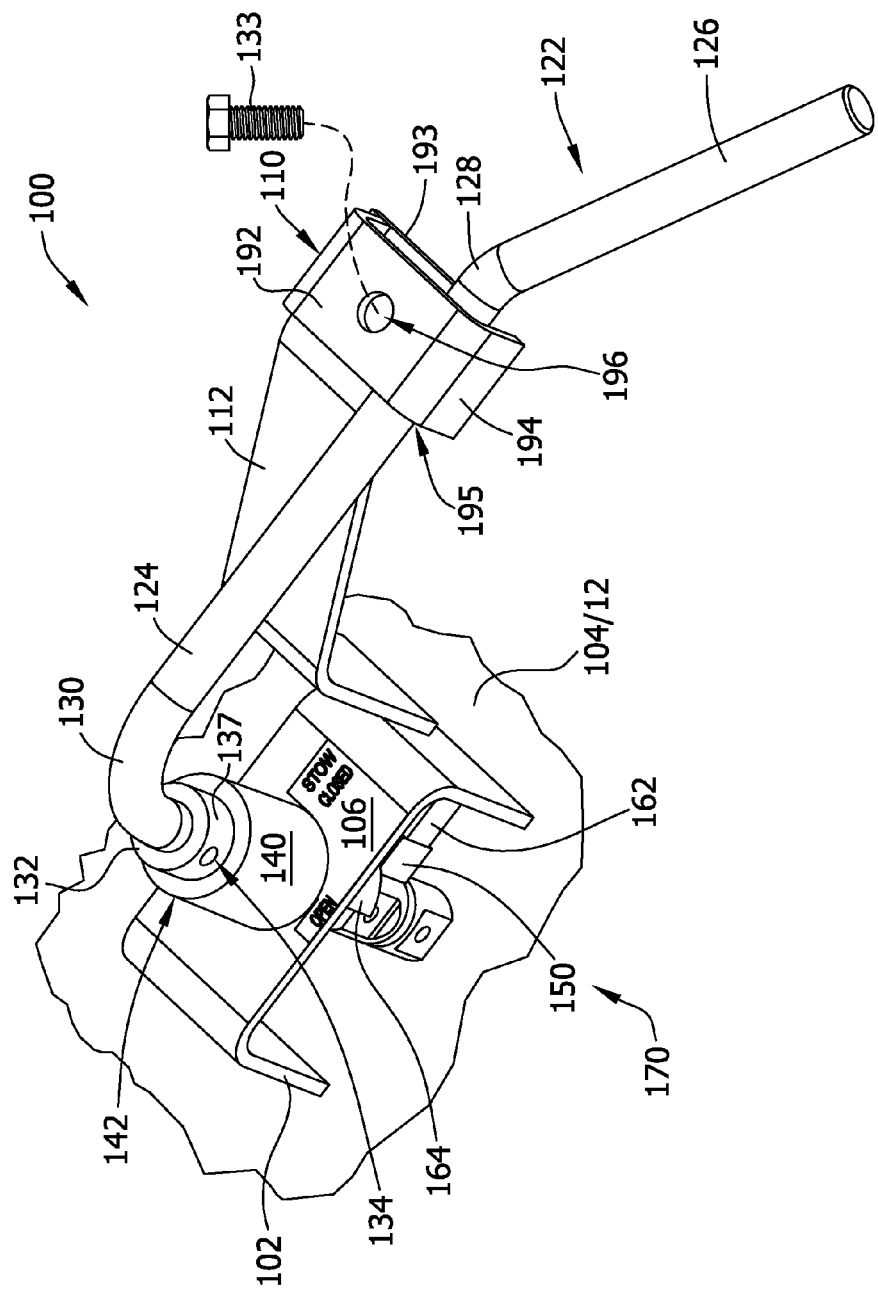

FIG. 3 is a schematic overhead view of an example valve interlock system 100 used with bottom outlet valve assembly 30. FIG. 4 is a schematic bottom view of valve interlock system 100. FIG. 5 is a schematic bottom perspective view of valve interlock system 100. Valve interlock system 100 includes a valve operator bracket 102 coupled to a structural member 104 of tank 12. Visual indicators 106 (only shown in FIG. 5) are positioned on valve operator bracket 102. A longitudinal direction 105, a longitudinal axis 107 parallel to longitudinal direction 105, and a transverse direction 109 substantially perpendicular to longitudinal direction 105 and axis 107 are provided for clarity (all three only shown in FIG. 3).

Valve interlock system 100 also includes a handle locking assembly 110 coupled to valve operator bracket 102 through a handle locking bracket support member 112. Therefore, in the example embodiment, handle locking assembly 110 is positioned a predetermined distance from tank 12.

Also, in the example embodiment, valve interlock system 100 includes a valve operator assembly 120. Valve operator assembly 120 includes an operator handle 122 configured to facilitate operation of ball 35 through valve stem 32, ball 35 and stem 32 are both a portion of bottom outlet valve assembly 30. Operator handle 122 includes a first portion 124 configured to rest within handle locking bracket 112. Operator handle 122 also includes a second portion 126 coupled to first portion 124 through an angled portion 128. Operator handle 122 further includes a bend portion 130 configured to coupled first portion 124 with valve stem 32 as described further below. Portions 124, 126, 128, and 130 of operator handle 122 are coupled through any means that enables operation of valve interlock system 100 and valve operator assembly 120 as described herein, including, without limitation, welding and unitary casting.

Further, in the example embodiment, valve operator assembly 120 includes a rotatably translatable and longitudinally translatable body 132 coupled to bend portion 130 of operator handle 122 through a fastener 133 removably inserted through a fastener opening 134. Alternatively, body 132 is coupled to bend portion 130 through any means that enables operation of valve interlock system 100 and valve operator assembly 120 as described herein, including, without limitation, welding and unitary casting. Body 132 includes a base portion 136 that includes an outer surface 137 and a beveled portion 138 that includes a beveled surface 139. In the example embodiment, base portion 136 and beveled portion 138 are coupled to each other through unitary fabrication of body 132. Alternatively, portions 136 and 138 are coupled to each other through any means that enables operation of valve interlock system 100 and valve operator assembly 120 as described herein, including, without limitation, welding. In the example embodiment, base portion 136 and the non-beveled region of beveled portion 138 are substantially cylindrical with a transverse diameter $D_1$. Alternatively, base portion 136 has any shape and configuration that enables operation of valve interlock system 100 and valve operator assembly 120 as described herein.

Valve operator assembly 120 also includes an outer sleeve 140 coupled to, and extending outwardly longitudinally from, valve operator bracket 102 through any means that enables operation of valve interlock system 100 and valve operator assembly 120 as described herein, including, without limitation, welding and unitary casting. Outer sleeve 140 defines a bore 142 extending there-through such that outer sleeve 140 extends about base portion 136 and facilitates transverse (radial) support thereof in conjunction with valve operator bracket 102. Outer sleeve 140 has an outer diameter $D_2$ and an inner diameter $D_3$ that are greater than diameter $D_1$. Inner diameter $D_3$ of outer sleeve 140 is slightly greater than body diameter $D_1$ such that base portion 136 is longitudinally and transversely slidable within outer sleeve 140.

Valve operator assembly 120 further includes a collar 150 coupled to, and extending inwardly longitudinally from, valve operator bracket 102 through any means that enables operation of valve interlock system 100 and valve operator assembly 120 as described herein, including, without limitation, welding and unitary casting. In the exemplary embodiment, collar 150 is substantially arcuate and is semicircular. Alternatively, collar 150 has any shape and configuration that enables operation of valve interlock system 100 and valve operator assembly 120 as described herein. Collar 150 has an outer diameter $D_4$ and an inner diameter $D_5$ that are greater than diameter $D_1$. Inner diameter $D_5$ of collar 150 is slightly greater than body diameter $D_1$ such that base portion 136 and the non-beveled region of beveled portion 138 are longitudinally and transversely slidable within collar 150. Collar 150 defines a longitudinal surface 152 and a transverse surface 154, both discussed further below. Valve operator assembly 120 also includes an operator extension 156 extending longitudinally inward from beveled portion 138.

Further, in the example embodiment, valve interlock system 100 includes a valve stem coupling device 158 rotatably coupled to valve stem 32 and operator extension 156 and extending longitudinally there-between. Coupling device 158 is substantially stationary in the longitudinal direction and rotatably translatable about longitudinal axis 107.

Moreover, in the example embodiment, valve interlock system 100 includes a valve stem locking subsystem 160. Valve stem locking system 160 includes a stationary support member 162 extending toward coupling device 158 in transverse direction 109. Stationary support member 162 defines a cavity 164 proximate coupling device 158. Valve stem locking system 160 also includes a biasing device 166 partially positioned within cavity 164, coupled to stationary support member 162 through an interference fit, and partially coupled to collar 150 through an interference fit. In the example embodiment, biasing device 166 is a spring, and in particular, a leaf spring. Alternatively, biasing device 166 is any device that induces sufficient bias to enable operation of valve interlock system 100 and valve operator assembly 120 as described herein. Beveled portion 138 is configured to press against biasing device 166, thereby depressing biasing device 166. Valve stem locking subsystem 160 is described further below. In the example embodiment, one stationary support member 162, one cavity 164, and one biasing device 166 are shown and described. Alternatively, a plurality of such device arrangements are used for purposes of increased locking strength and redundancy, e.g., and without limitation, a symmetrical arrangement of these devices on the transversely opposite side with respect to valve stem coupling device 158. Furthermore, in the example embodiment, valve interlock system 100 includes a valve stem rotation restriction subsystem 170 that includes collar 150. Valve stem rotation restriction subsystem 170 is described further below.

Figure 6:
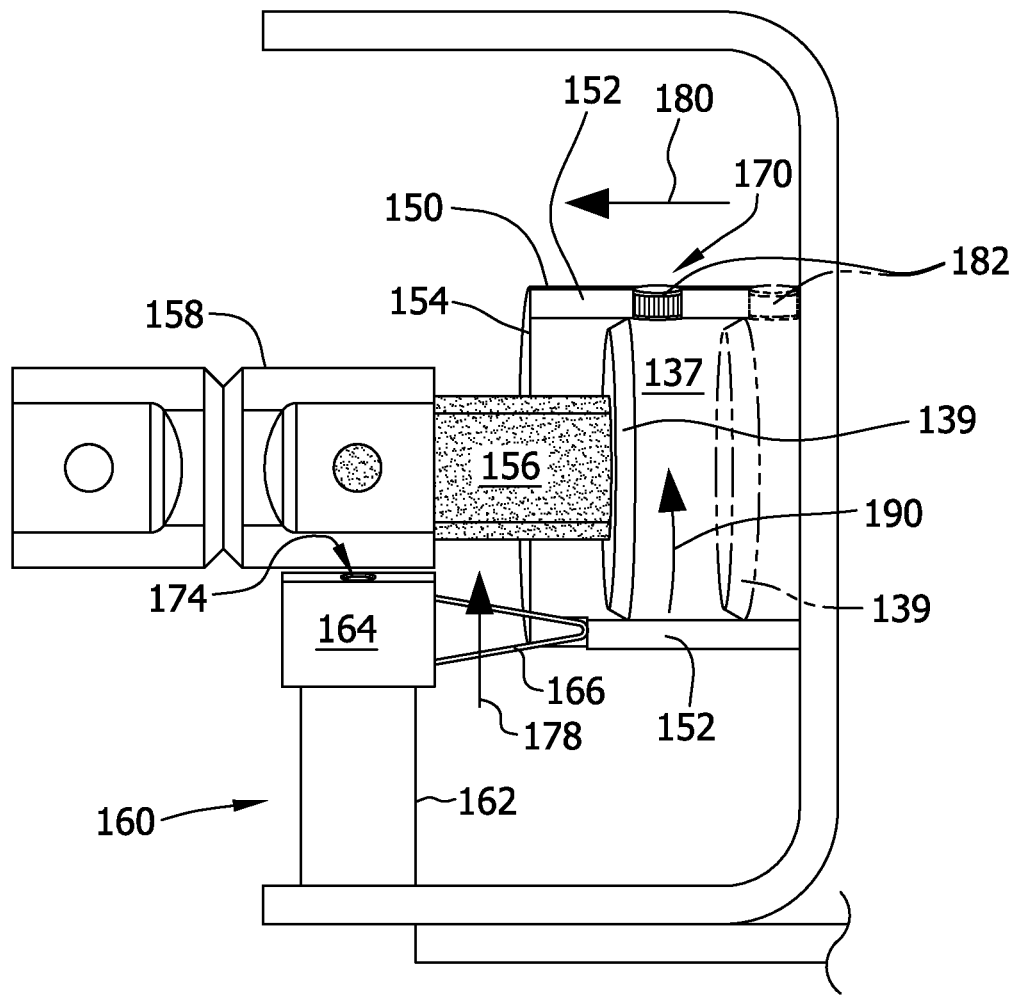
Figure 7:
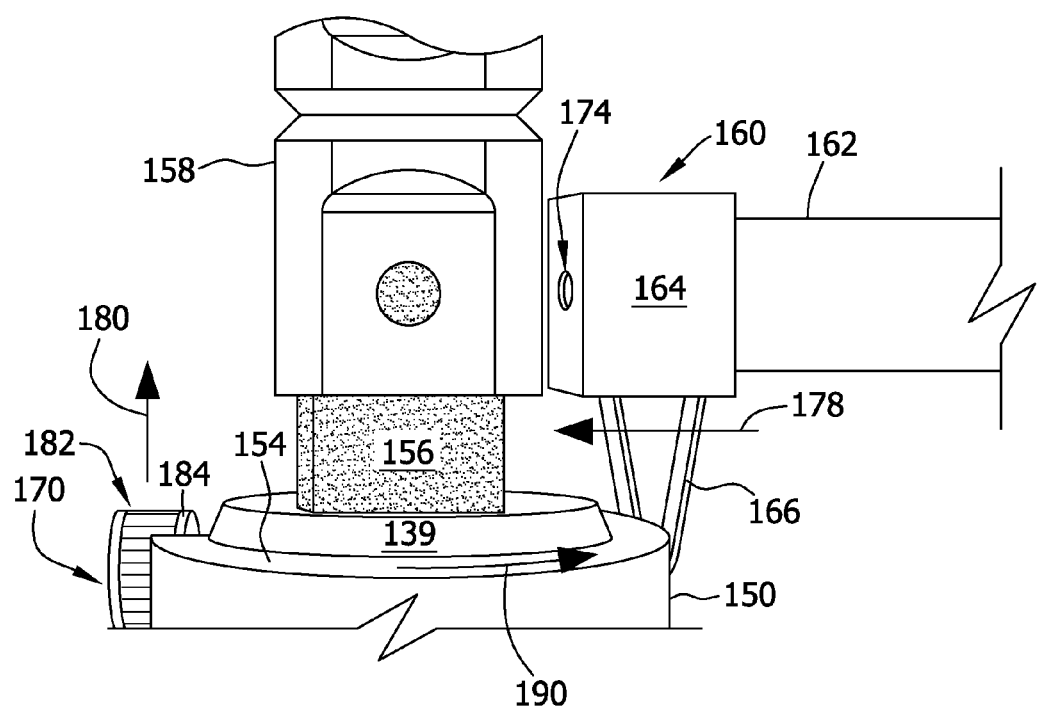
Figure 8:
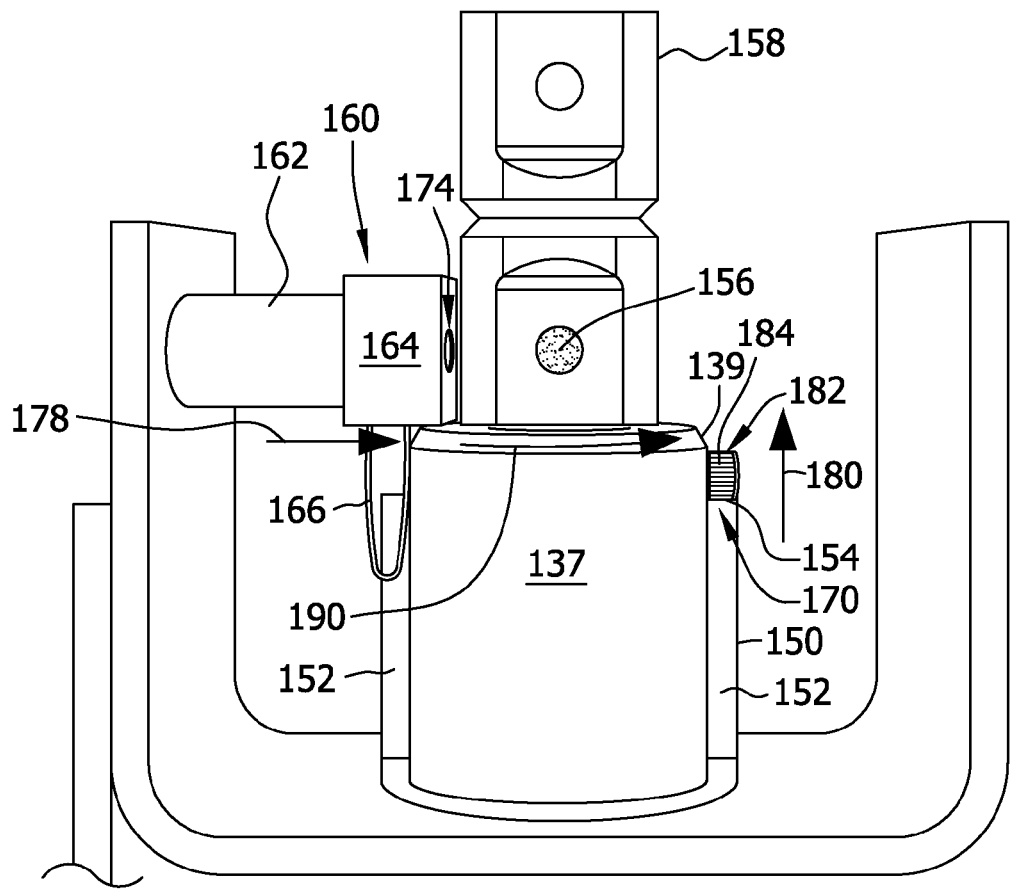
Figure 9:
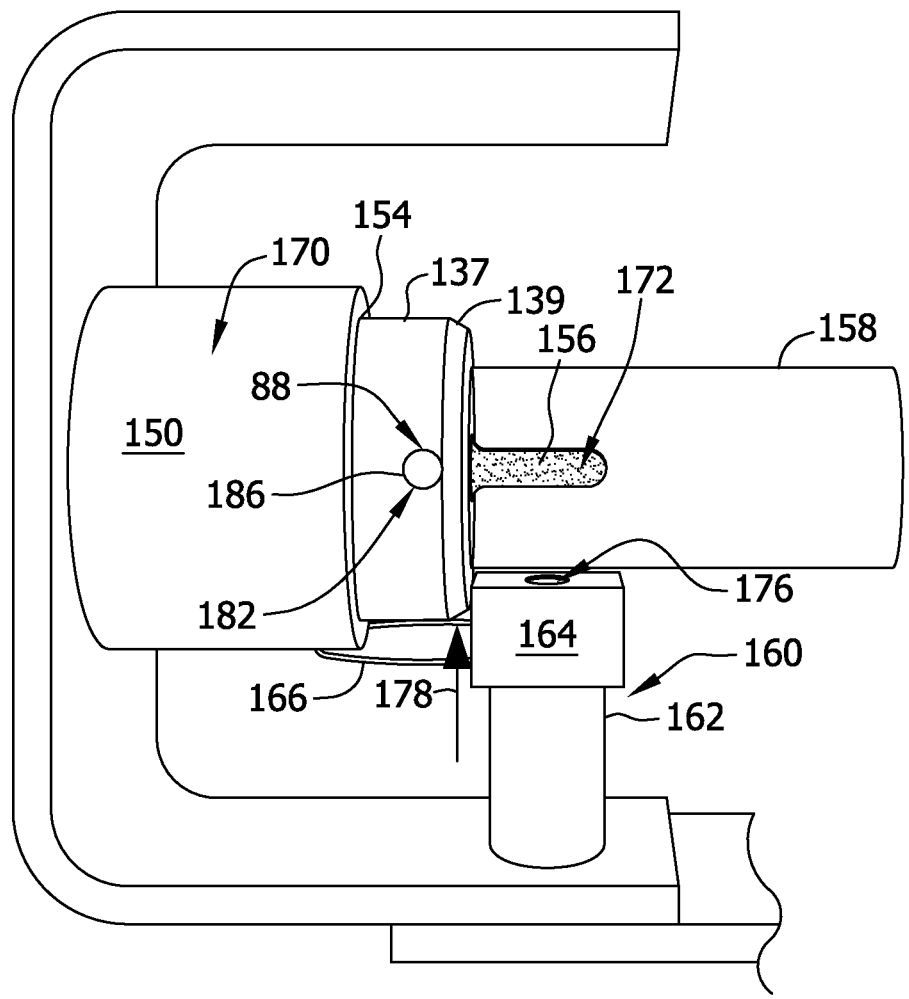

FIG. 6 is a schematic view of valve stem locking subsystem 160 in a fully engaged state and valve stem rotation restriction subsystem 170 in a rotation restrictive state. FIG. 7 is a schematic view of valve stem locking subsystem 160 in a partially disengaged state and valve stem rotation restriction subsystem 170 in a rotation restrictive state transiting to a nonrestrictive state. FIG. 8 is a schematic view of valve stem locking subsystem 160 in a fully disengaged state and valve stem rotation restriction subsystem 170 in a rotation nonrestrictive state. FIG. 9 is a schematic view of valve stem locking subsystem 160 in a fully disengaged state and valve stem rotation restriction subsystem 170 in a rotation nonrestrictive state with valve stem coupling device 158 turned 90 degrees.

Coupling device 158 defines an engagement slot 172 (only shown in FIG. 9) thereon. In addition to engagement slot 172, valve stem locking subsystem 160 includes a locking member 174 (only shown in FIGS. 6 and 7) at least partially positioned within cavity 164. Locking member 174 is transversely translatable and complimentary with engagement slot 172. Also, stationary support member 162 defines a locking member opening 176 (only shown in FIGS. 8 and 9) coupled to cavity 164, where opening 176 is oriented and configured to facilitate the transverse translation of locking member 174 in and out of engagement slot 172. In the example embodiment, locking member 174 is a steel pin. Alternatively, locking member 174 is any device that enables operation of valve interlock system 100 and valve operator assembly 120 as described herein.

Locking member 174 is positioned within cavity 164 and is held in place through an interference fit. Alternatively, any fastening means for securing locking member 174 to stationary support member 162 is used as long as locking member 174 retains transverse translation features. Also, biasing device 166 is coupled to one of the two longitudinal surfaces 152 of collar 150 through a partial interference fit, i.e., only one side of biasing device 166 is touching surface 152. Further, biasing device 166 is coupled to locking member 174 through an interference fit. Biasing device 166 is configured to increase an induced engagement bias (shown by arrow 178) as beveled surface 139 advances longitudinally inward, as shown by longitudinal translation arrow 180, surface 139 compresses biasing device 166. As such, locking member 174 is transversely translated away from engagement slot 172 as biasing device, i.e., leaf spring 166 compresses. The increased engagement bias 178 due to compression of biasing device 166 through valve stem locking subsystem 160 from the locked state to the unlocked state facilitates the return of subsystem 166 to the locked state upon retraction of beveled surface 139. Biasing device 166 is configured to induce a snapping action to pull locking member 174 from engagement slot 172 to facilitate attaining the unlocked state prior to opening operation of ball 35. Biasing device 166 is also configured to induce a gradual reintroduction of locking member 174 into engagement slot 172 to facilitate surety of reengagement thereof. Therefore, in the example embodiment, beveled portion 138 of longitudinally and rotatably translatable body 132 of valve operator assembly 120 regulates slot engagement bias 178 as a function of a longitudinal position of beveled portion 138.

In addition, operator extension 156 longitudinally extends into valve stem coupling device 158 and facilitates blocking engagement slot 172 from receiving locking member 174. As such, until ball 35 is fully closed and operator extension 156 is sufficiently withdrawn longitudinally from valve stem coupling device 158, valve stem locking subsystem 160 will not lock valve operator assembly 120 from operation.

In the example embodiment, in addition to collar 150 and the associated two longitudinal surfaces 152 and transverse surface 154, valve stem rotation restriction subsystem 170 also includes a rotation restriction device 182 coupled to and extending transversely from outer surface 137 of base portion 136 of body 132. In the example embodiment, rotation restriction device 182 is a fastener-type device including a head portion 184 and a fastening portion 186. Fastening portion 186 is threaded and is complimentary to a threaded passage 188 (only shown in FIG. 9) defined in base portion 136 of body 132 proximate beveled portion 138. As described above, semicircular collar 150 includes two longitudinal surfaces configured to contact head portion 184 of rotation restriction device 182 such that longitudinal translation of body 132 is permitted as head portion 184 slides along surface 152. However, rotational translation of body 132 in the direction of arrow 190 is substantially restricted, i.e., prevented through head portion 184 not rotating past surface 152. Rotation of body 132 in the direction opposite arrow 190 where the semicircular collar 150 does not exist is prevented through any device within bottom outlet valve assembly 30, including, without limitation, rotational stops (not shown) proximate ball 35 and body 31 (shown in FIG. 2). Therefore, valve stem coupling device 158 will not rotate and ball 35 will not rotate through rotation of stem 32. As such, valve stem rotation restriction subsystem 170 prevents rotation of body 132 and permits longitudinal translation of body 132 while bottom outlet valve assembly 30 is in a substantially closed position.

Sufficient longitudinal travel of body 132 is configured in valve stem rotation restriction subsystem 170 such that head portion 184 of rotation restriction device 182 longitudinally traverses and leaves longitudinal surface 152 and travels past transverse surface 154. As such, rotational motion of body 132, and head portion 184, in the direction of arrow 190 is permitted. Typically, by this point, operator extension 156 is substantially, and in some cases, fully inserted into valve stem coupling device 158 such that further longitudinal translation of body 132 is substantially restricted and only rotational translation of body 132 is allowed. In some examples, head portion 184 rides on transverse surface 154 of collar 150 to provide longitudinal support of head portion 184. Opening and closing operation of bottom outlet valve assembly 30 is now permitted.

Figure 10:
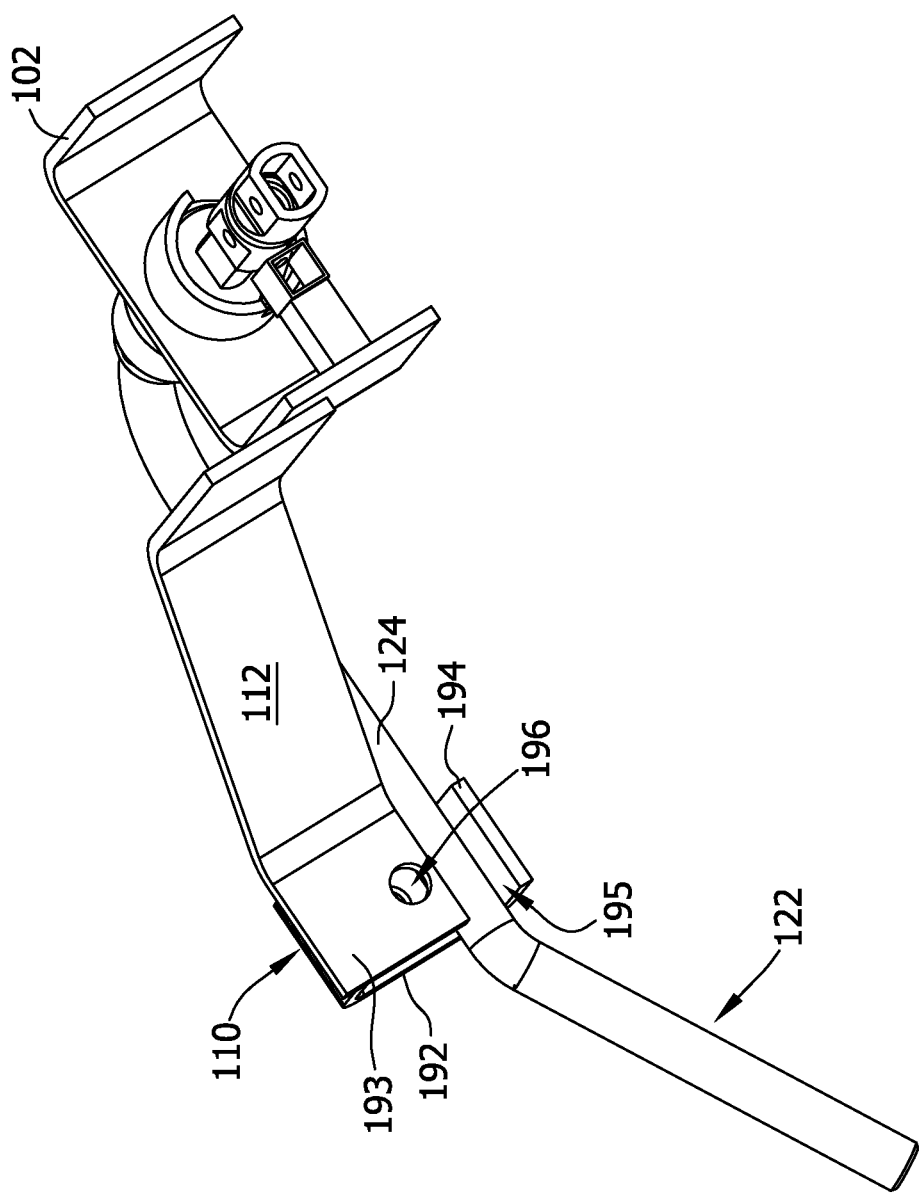

FIG. 10 is a schematic view of valve handle locking assembly 110. Assembly 110 includes a front plate 192 and a back plate 193, both coupled to handle locking bracket support member 112. Assembly 110 also includes a lower lip portion 194 coupled to front plate 192. Lower lip portion 194 and back plate 193 together define a handle opening 195 configured to receive first portion 124 of handle 122. Front plate 192 and back plate 193 define a fastener passage 196 configured to receive fastener 133 (shown in FIG. 5) that is removably coupled to front plate 192 and back plate 193. In the example embodiment, operator handle 122 is positioned in handle opening 195 and shifted upward slightly to allow fastener 133 to be inserted through fastener passage 196 under operator handle 122. Fastener 133 and valve handle locking assembly 110 substantially reduces a potential for inadvertent rotational movement of operator handle 122, and therefore substantially constrains body 132 (shown in FIGS. 4 and 5) when handle locking assembly 110 is in a locked status. Fastener opening 134 for body 132 and fastener opening 196 for handle locking assembly 110 are configured to use the same fastener 133. Using the same fastener to alternately stow handle 122 and operate valve operator assembly 120 through handle 122 facilitates reducing a potential for inadvertently opening ball 35.

Referring to FIGS. 3-10, a method of opening ball 35 of bottom outlet valve assembly 30 from a closed condition includes an operator removing fastener 133 from fastener passage 195. The operator removes operator handle 122 from handle locking assembly 110 through handle opening 195, thereby shifting handle 122 from the "STOWED" position to the "CLOSED" position of visual indicators 106. The operator inserts fastener 133 into fastener opening 134 for body 132. Operator handle 122 receives inward force induced by the operator such that body 132 begins to move inward longitudinally. The starting position for head portion 184 of restriction device 182 and beveled surface 139 of beveled portion 138 of body 132 is shown in phantom in FIG. 6.

As head portion 184 longitudinally transits along longitudinal surface 152, beveled surface 139 advances longitudinally inward as shown by arrow 180 and surface 139 compresses biasing device 166 as shown by longitudinal translation arrow 180. Such compression of biasing device 166 increases the induced engagement bias 178. As such, locking member 174 is transversely translated away from engagement slot 172 as biasing device 166 compresses. Biasing device 166 induces a snapping action to pull locking member 174 from engagement slot 172. Operator extension 156 longitudinally extends into valve stem coupling device 158 and facilitates blocking engagement slot 172 from receiving locking member 174. As such, until ball 35 is fully closed and operator extension 156 is sufficiently withdrawn longitudinally from valve stem coupling device 158, valve stem locking subsystem 160 will not lock valve operator assembly 120 from operation.

Further, as head portion 184 longitudinally transits along longitudinal surface 152, rotational translation of body 132 in the direction of arrow 190 is substantially restricted, i.e., prevented through head portion 184 not rotating past surface 152. Once head portion 184 longitudinally traverses and leaves longitudinal surface 152 and travels past transverse surface 154, rotational motion of body 132 and head portion 184 in the direction of arrow 190 is permitted. Typically, by this point, operator extension 156 is substantially, and in some cases, fully inserted into valve stem coupling device 158 such that further longitudinal translation of body 132 is substantially restricted and only rotational translation of body 132 is allowed. The operator of handle 122 shifts handle 122 downward from the "CLOSED" position to the "OPEN" position as indicated by visual indicators 106. The 90 degree rotation of handle 122 from the "CLOSED" position to the "OPEN" position rotationally translates body 132, including head portion 184 ninety degrees in the direction of arrow 190. Such rotation also rotates operator extension 156, valve stem coupling device 158, and valve stem 32 ninety degrees and ball 35 translates from the closed state to the open state. The rotation of valve stem coupling device 158 rotates engagement slot 172 ninety degrees away from locking member opening 176 on stationary support member 162.

Once the operator decides that ball 35 should be closed, the operator moves handle 122 upwards from the "OPEN" position to the "CLOSED" position on visual indicators 106.

Body 132, operator extension 156, valve stem coupling device 158, and valve stem 32 translate ninety degrees as ball 35 translates from the open state to the closed state. Head portion 184 translates 90 degrees such that head portion 184 lines up longitudinally with longitudinal surface 152. Also, engagement slot 172 on valve stem coupling device 158 rotates 90 degrees such that engagement slot 172 and locking member opening 176 on stationary support member 162 are aligned. The operator then pulls on handle 122 to longitudinally withdraw body 132. As body 132 is longitudinally withdrawn, the engagement bias 178 acts to steadily insert locking member 174 into engagement slot 172 until member 174 is fully inserted into slot 172 and biasing device 166 is restored to its relaxed condition. The increased engagement bias 178 due to compression of biasing device 166 through the unlocking phase of valve stem locking subsystem 160 from the locked state to the unlocked state facilitates restoring subsystem 160 to the locked state. As such, since ball 35 is fully closed and operator extension 156 is sufficiently withdrawn longitudinally from valve stem coupling device 158, valve stem locking subsystem 160 locks valve operator assembly 120 from any further rotational operation. Once head portion 184 contacts valve operator bracket 102 and the operator feels the resistance to further withdrawal, the operator pulls fastener 133 from fastener opening 134, the operator inserts handle 122 into handle opening 195, and lifts handle 122 so that it shifts from the "CLOSED" indication to the "STOWED" indication. Then, the operator inserts fastener 133 into fastener passage 196.

Therefore, in operation, when operator handle 122 is positioned at the "STOWED" indication, fastener 133 is removed from fastener opening 134, and handle 122 is disengaged from body 132, thereby substantially removing a potential for inadvertent opening of bottom outlet valve assembly 30 through forces received by railcar 10 when in transit. Also, fastener 133 is used to secure handle 122 in an accessible location that facilitates the indicated status of handle 122 being easily discernable by operators of railcar 10. Further, inadvertent opening of bottom outlet valve assembly 30 is substantially reduced by valve stem locking subsystem 160 and valve stem rotation restriction subsystem 170. Specifically, locking member 174 engaged with engagement slot 172 defined in valve stem coupling device 158 and head portion 184 of rotation restriction device 182 contacting longitudinal surface 152 of collar 150 significantly restrict rotational movement of valve stem 32.

Figure 11:
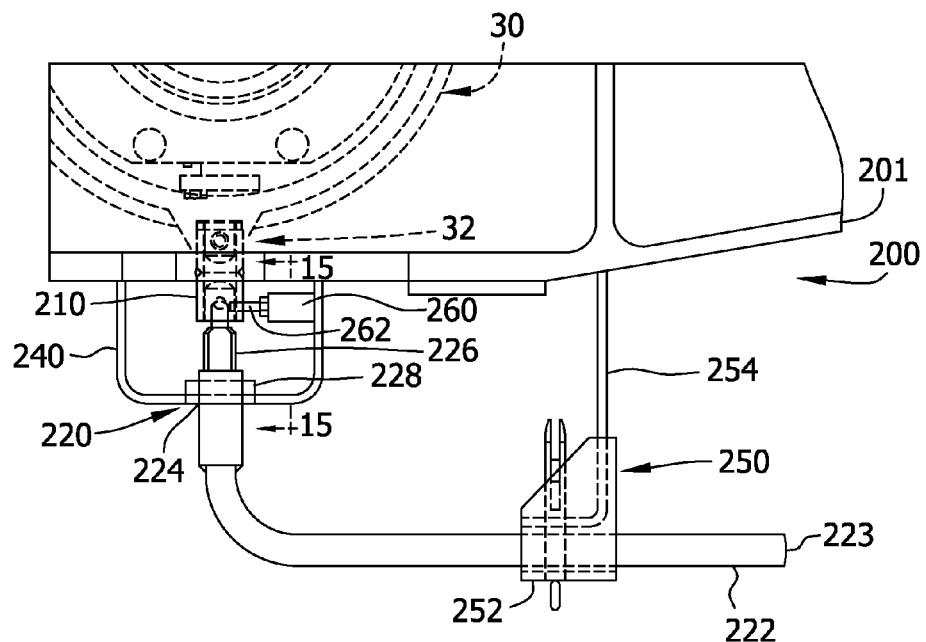
Figure 12:
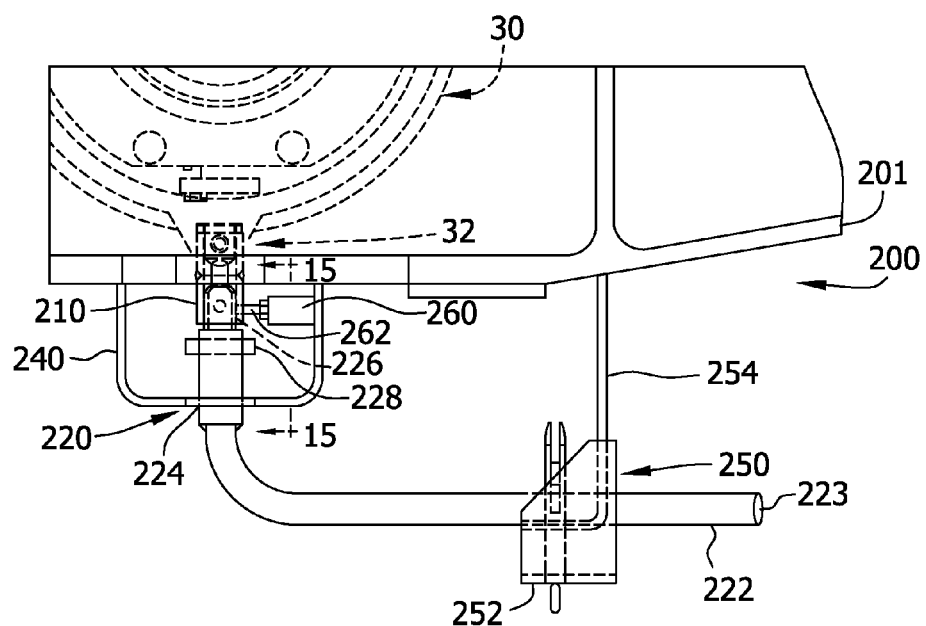

FIG. 11 is a schematic overhead perspective view of another example valve interlock system 200 used with outlet valve assembly 30 in a disengaged position. FIG. 12 is a schematic overhead perspective view of valve interlock system 200, used with outlet valve assembly 30 in an engaged position. Referring to FIG. 11 and FIG. 12, valve interlock system 200 includes a valve stem coupling 210, a valve operator assembly 220, a valve interlock bracket 240, a locking assembly 250, and a retaining pin assembly 260. Valve stem coupling 210 is rotatably coupled to valve stem 32. Accordingly, rotation of valve stem coupling 210 induces rotation in valve stem 32. Valve stem coupling 210 extends through a structural member 201.

Valve operator assembly 220 includes operator handle 222 and valve operator collar 224. Operator handle 222 includes an operator end 223 and a coupling end 226. Valve operator assembly 220 also includes a bracing pin 228. Bracing pin 228 extends through the body of operator handle 222 proximate to coupling end 226. Operator handle 222 may be manually moved by a human operator (not shown) pivoting valve operator assembly 220 at operator end 223. Coupling end 226 allows operator handle 222 to interface with valve stem coupling 210. Accordingly, when valve operator assembly 220 is inserted into valve stem coupling 210 and rotated, operator handle 222 is used to rotate valve stem 32 between an open and a closed position. More specifically, operator handle 222 may be used to rotate ball 35 between the open and closed positions. In FIG. 12, valve operator assembly 220 is in a disengaged position or a retracted position. As such, in FIG. 12, valve operator assembly 220 is not inserted into valve stem coupling 210. In FIG. 12, valve operator assembly 220 is in an engaged position or an inserted position. As such, in FIG. 12, valve operator assembly 220 is inserted into valve stem coupling 210. Therefore, valve operator assembly 220 of FIG. 11 cannot cause valve stem 32 to rotate without first engaging with valve stem coupling 210. As discussed further below, when valve operator assembly 220 is locked in locking assembly 250, valve operator assembly 220 cannot enter an engaged or inserted position.

Bracing pin 228 functionally controls the use of valve operator assembly 220 and has at least two functional aspects. As discussed further below in a first example when valve operator assembly 220 has been engaged or inserted into valve stem coupling 210 and rotated to rotate valve stem 32, valve operator assembly 220 cannot be retracted from valve stem coupling 210 without first reversing the rotation of valve operator assembly 220 and valve stem coupling 210. Specifically, as discussed below, interaction between bracing pin 228 and at least a portion of valve interlock bracket 240 substantially prevents such retraction and prevents valve operator assembly 220 from being retracted while valve assembly 30 is partially or fully open.

In a second example, bracing pin 228 substantially prevents valve operator assembly 220 from being retracted out of valve interlock bracket 240. Accordingly, bracing pin 228 causes valve operator assembly 220 to remain in a substantially enclosed area and mitigates a potential for valve operator assembly 220 being inadvertently removed. Line 15-15 substantially indicates a portion of valve operator assembly 220. In the example embodiment, bracing pin 228 is welded to valve operator handle 222 proximate to coupling end 226. In alternative embodiments, alternative methods of coupling may be used including, for example and without limitation, mechanical fasteners and adhesives.

Operator handle 222 includes a valve operator collar 224 positioned proximate coupling end 226. Valve operator collar 224 is positioned in bracket 240 such that valve operator assembly 220 and, more specifically, coupling end 226 is aligned with valve stem coupling 210. As such, valve operator collar 224 is placed such that valve operator assembly 220 may be inserted smoothly into valve stem coupling 210.

Valve interlock bracket 240 is coupled to tank 12 of tanker railcar 10 (shown in FIG. 1). In the example embodiment, valve interlock bracket 240 is welded to tank 12. In alternative embodiments, valve interlock bracket 240 may be coupled to tanker railcar 10 with any suitable method including, for example and without limitation, mechanical fasteners and adhesives. Valve operator collar 224 extends through valve interlock bracket 240. As discussed further below, in the example embodiment retaining pin assembly 260 is coupled to valve interlock bracket 240. In the example embodiment, retaining pin assembly 260 is welded to valve interlock bracket 240. In alternative embodiments, alternative methods of coupling may be used including, for example and without limitation, mechanical fasteners and adhesives.

Figure 13:
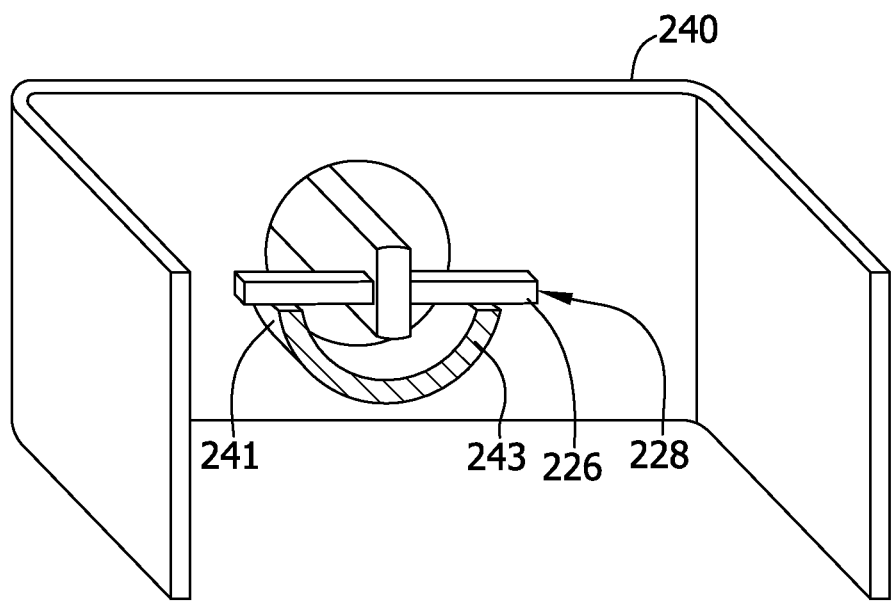

FIG. 13 illustrates a schematic lateral side view of a portion of example valve interlock bracket 240 and further showing a portion of valve interlock system 200 (shown in FIG. 11), used with bottom outlet valve assembly 30 (shown in FIG. 2) in a first, i.e., closed position. In contrast to FIG. 13, FIG. 14 illustrates a schematic lateral side view of a portion of valve interlock bracket 240 and further showing a portion of valve interlock system 200, used with bottom outlet valve assembly 30 in a second, i.e., open position.

Figure 14:
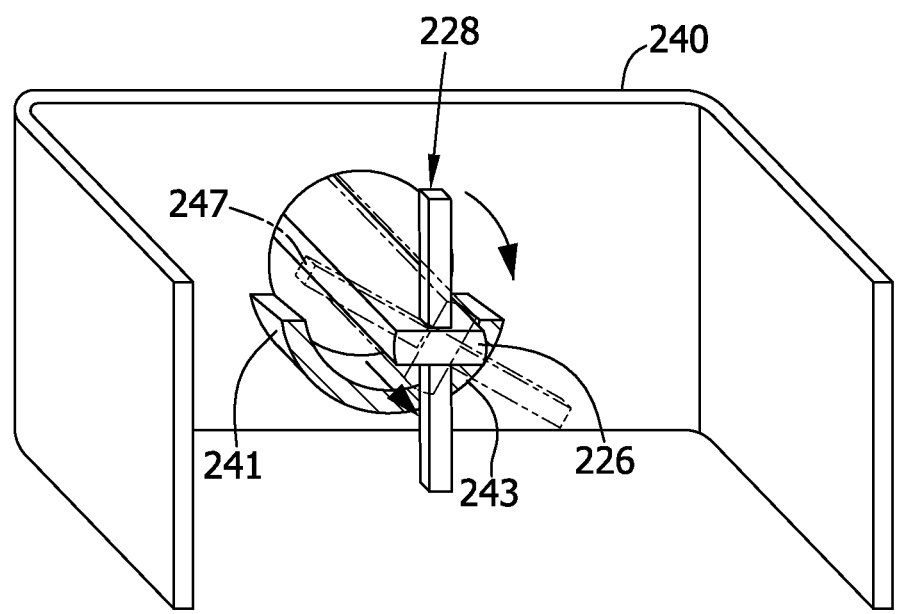

Referring to FIGS. 13 and 14, valve interlock bracket 240 includes bracket collar 241. In the example embodiment, bracket collar 241 is substantially arcuate. Bracket collar 241 includes a bracket face 243. In the example embodiment, bracket collar 241 is oriented below bracing pin 228 when bottom outlet valve assembly 30 (shown in FIG. 2) is in a substantially closed position. In alternative embodiments, bracket collar 241 may be oriented above bracing pin 228 when bottom outlet valve assembly 30 is in a substantially closed position. In alternative embodiments, a plurality of bracket collars 241 with a plurality of bracket faces 243 may be used. In additional embodiments, other variations and numbers of bracket collars 241 may be used in a manner suitable for the methods and systems described. In the example embodiment, bracket collar 241 is welded to valve interlock bracket 240. In alternative embodiments, alternative methods of coupling may be used including, for example and without limitation, mechanical fasteners and adhesives. The placement of bracket collar 241 allows bracket collar 241 to receive bracing pin 228 above bracket collar 241 when bottom outlet valve assembly 30 is in a substantially closed position, as discussed below.

As described above, FIG. 13 illustrates a schematic lateral side view of a portion of example valve interlock bracket 240 and further showing a portion of valve interlock system 200 (shown in FIG. 11), used with bottom outlet valve assembly 30 (shown in FIG. 2) in a first, i.e., closed position. As such, valve interlock system 200 in FIG. 13 is in a closed position and bottom outlet valve assembly 30 is similarly substantially closed. Also, as discussed above, bracing pin 228 is substantially parallel with valve interlock bracket 240. Bracing pin 228 is also in a first orientation with regard to a rail track (not shown) upon which railcar 10 (shown in FIG. 1) is running. In this orientation, bracing pin 228 is not in contact with valve interlock bracket 240 or, more specifically, bracket face 243. Valve operator assembly 220 (shown in FIG. 11) and, more specifically, coupling end 226 can be accordingly inserted into valve stem coupling 210 or retracted from valve stem coupling 210 without obstruction.

In contrast to FIG. 13, FIG. 14 illustrates a schematic lateral side view of a portion of valve interlock bracket 240 and further showing a portion of valve interlock system 200, used with bottom outlet valve assembly 30 in a second, i.e., open position. In FIG. 14, valve operator assembly 220 and, more specifically, coupling end 226 has been inserted into valve stem coupling 210 and rotated approximately ninety degrees. As such, valve interlock system 200 is in an open position and bottom outlet valve assembly 30 is similarly substantially open.

Also in FIG. 14, bracing pin 228 is substantially perpendicular with valve interlock bracket 240. As discussed above, in this second position, bracing pin 228 prevents removal of valve operator assembly 220, and more specifically, coupling end 226 from valve stem coupling 210 unless valve operator assembly 220 is first rotated to a closed position. This is because bracing pin 228 contacts at least a portion of bracket collar 241 if retraction is attempted while valve operator system 220 is rotated to a closed position. More specifically, bracing pin 228 contacts at least a portion of bracket face 243 if retraction is attempted while valve operator assembly 220 is rotated to a closed position. As such, bracing pin 228 prevents valve operator assembly 220 from being removed while bottom outlet valve assembly 30 is open.

Additionally, even when valve operator assembly 220 is rotated to only a partially open position shown in phantom as partially open position 247, bracing pin 228 contacts at least a portion of bracket collar 241 and, more specifically, at least a portion of bracket face 243 and therefore prevent retraction. As such bracing pin 228 prevents valve operator assembly 220 from being removed while bottom outlet valve assembly 30 is partially open due to the frictional interaction with at least a portion of bracket face 243. As such, when bracing pin 228 is positioned in a second orientation at an angle with regard to the first orientation (described above) that is within a range between approximately 1° and 90°, at least a portion of bracing pin 228 is in contact with at least a portion of bracket face 243. Note that although bracket collar 241 is shown in FIG. 13 as being oriented below bracing pin 228, bracket collar 241 may alternately be oriented above bracing pin 228 with similar effects. Bracing pin 228 can contact bracket collar 241 when bracket collar 241 is in multiple orientations and prevent valve operator assembly 220 from retraction.

Returning to FIGS. 11 and 12, locking assembly 250 includes locking bracket 252 and locking member 254. Locking bracket 252 is coupled to tank 12. In the example embodiment, locking bracket 252 is welded to tank 12. In alternative embodiments, locking bracket 252 may be coupled to tank 12 using methods of coupling including, for example and without limitation, mechanical fasteners and adhesives. Locking member 254 is coupled to locking bracket 252. In the example embodiment, locking member 254 is welded to locking bracket 252. In alternative embodiments, locking bracket 252 may be coupled to locking member 254 using methods of coupling including, for example and without limitation, mechanical fasteners and adhesives.

Locking assembly 250 and, more specifically, locking member 254 are configured to receive valve operator assembly 220 and, more specifically, to receive operator handle 222. As such, operator handle 222 is placed in locking member 254 and further locked into place by locking member 254. However, due to the positioning of locking bracket 252, operator handle 222 may only be placed in locking member 254 when operator handle 222 is in a disengaged or retracted position as shown in FIG. 11. In an engaged position, as shown in FIG. 12, operator handle 222 cannot align with locking member 254. Accordingly, locking assembly 250 and, more generally, valve operator interlock system 200, facilitates enabling locking assembly 250 to be used to indicate that valve operator assembly 220 is not engaged. As valve stem coupling 210 may only be partially or fully opened when valve operator assembly 220 is engaged, an indication that valve operator assembly 220 is in locking member 254 further indicates that valve stem 32 and, therefore, outlet valve assembly 30, is not in an open position.

Figure 15:
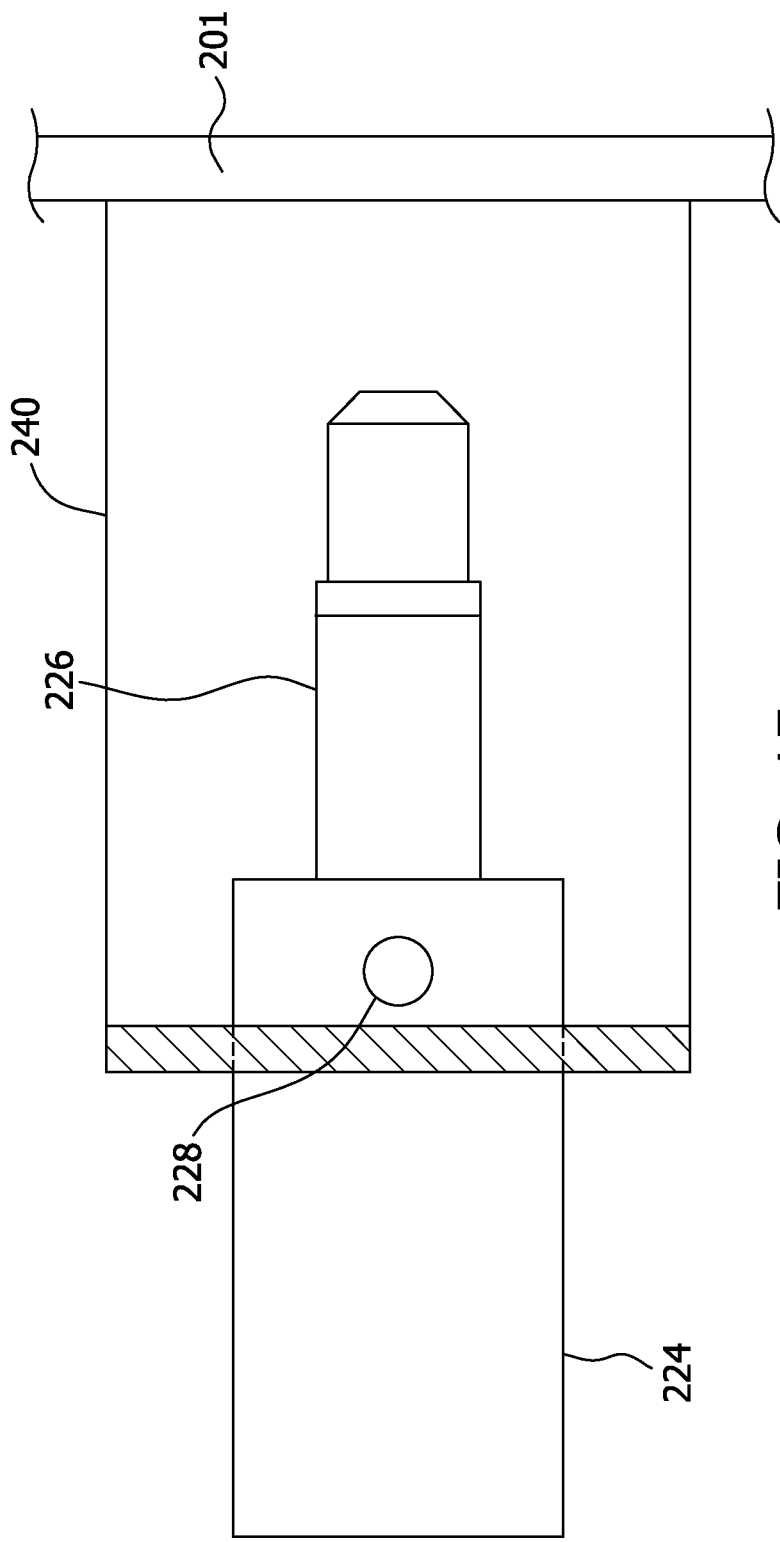

FIG. 15 is a schematic lateral side view of a portion of valve operator assembly 220 taken along line 15-15 (both shown in FIGS. 11 and 12). In this view, the positioning of valve operator collar 224 and, more specifically, bracing pin 228, with respect to valve interlock bracket 240 is shown. Bracket collar 241 is not shown for clarity. Bracing pin 228 extends laterally from valve operator collar 224 and causes valve operator collar 224 and, more generally, valve operator assembly 220 to contact valve interlock bracket 240 if valve operator assembly 220 is retracted. Accordingly, bracing pin 228 prevents valve operator assembly 220 from being substantially removed from valve interlock system 200 (shown in FIGS. 11 and 12).

Figure 16:
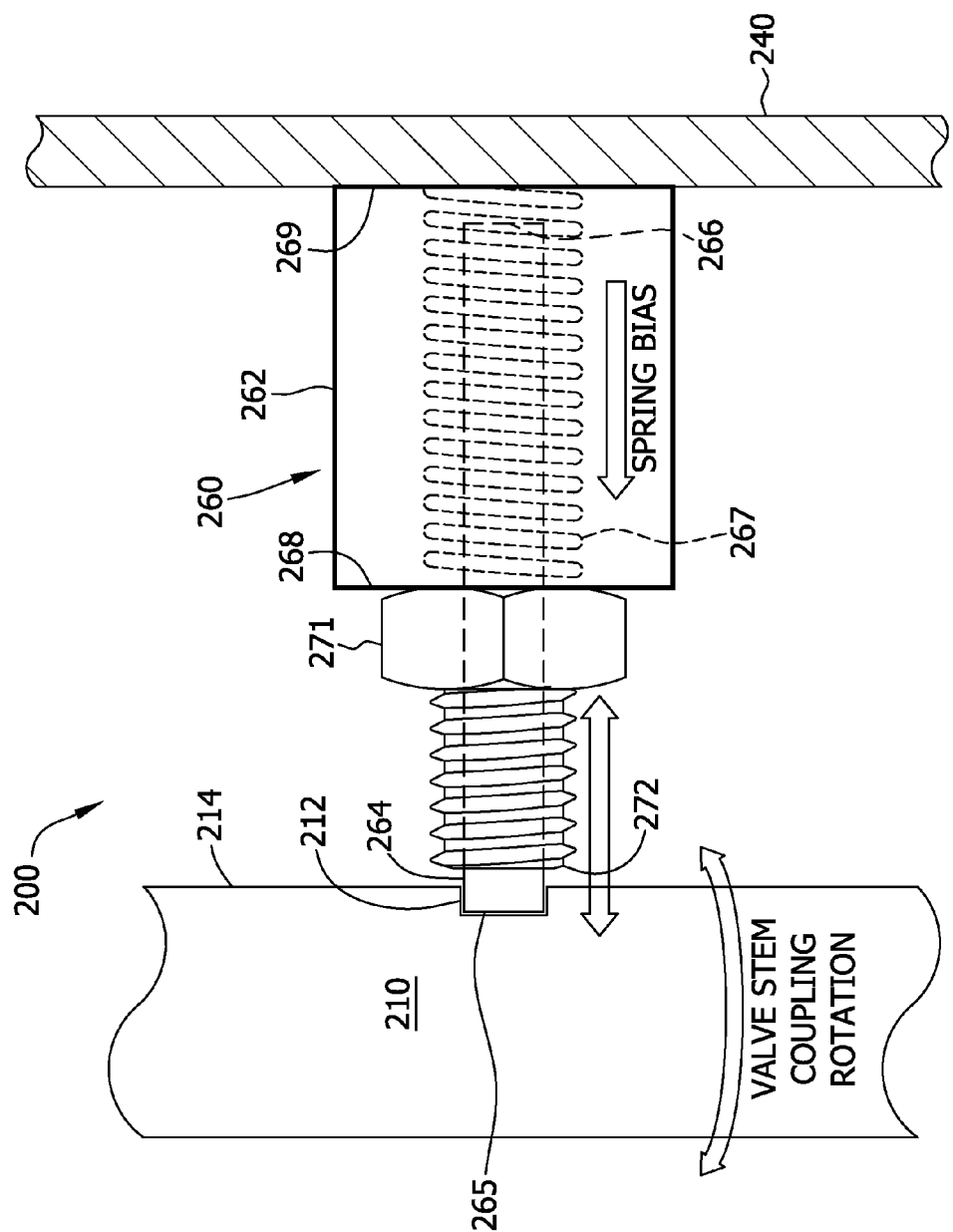

FIG. 16 is a schematic lateral overhead view of retaining pin assembly 260. In the example embodiment, retaining pin assembly 260 is coupled to valve interlock bracket 240. In alternative embodiments, retaining pin assembly 260 may be located on any portion of valve interlock system 200 that may facilitate the apparatus and methods described herein. As described above, retaining pin assembly 260 is a spring-loaded mechanism. Retaining pin assembly 260 includes a body 262, a retaining pin 264, and a spring 267. Body 262 has a first face 268 and an opposing second face 269. Retaining pin 264 extends from a first end 265 to a second end 266. Spring 267 extends between first face 268 and second face 269. Retaining pin assembly 260 also includes nut 271 which is in communication with body 262 and a threaded portion 172 of retaining pin 164.

Retaining pin assembly 260 extends towards valve stem coupling 210. As shown in FIG. 16, valve stem coupling 210 includes a graduated indent 212 and valve stem coupling surface 214. When bottom outlet valve assembly 30 is in a closed position, valve stem coupling 210 is accordingly oriented as shown in FIG. 16 and therefore capable of receiving retaining pin assembly 260 and, more specifically, retaining pin 264. When bottom outlet valve assembly 30 is not in a substantially closed position, graduated indent 212 is not capable of receiving retaining pin assembly 260. More specifically, when bottom outlet valve assembly 30 is not in a substantially closed position, graduated indent 212 is rotated so that retaining pin 264 contacts valve stem coupling surface 214 instead of graduated indent 212. Accordingly, when bottom outlet valve assembly 30 is in a closed position, retaining pin assembly 260 substantially enters graduated indent 212. More specifically, first end 265 extends into graduated indent 212.

When valve stem coupling 210 rotates from a closed position to an open position (i.e., using operator handle 222 to rotate bottom outlet valve assembly 30), graduated indent 212 moves to a different orientation. Accordingly, spring 267 compresses as retaining pin 264 is retracted into body 262 and the bias of spring 267 is increased. Therefore, when bottom outlet valve assembly 30 is moved to a closed position, the bias of spring 267 induces movement of retaining pin 264 such that it moves into graduated indent 212.

In operation, when operator handle 222 is disengaged, valve stem coupling 210 is substantially held in place by retaining pin assembly 260. Accordingly, when valve interlock system 200 is in a stowed position (i.e., when operator handle 222 is locked in locking assembly 250), retaining pin assembly 260 substantially prevents valve stem coupling 210 from moving. For example, when tanker railcar 10 is in motion and valve interlock system 200 is in a stowed position, tanker railcar 10 and tank 12 may experience forces. The presence of retaining pin assembly 260 will prevent valve stem coupling 210 from moving and, more specifically, from rotating and inadvertently causing bottom outlet valve assembly 30 to open. Accordingly, retaining pin assembly 260 functions as an additional mechanism for preventing inadvertent opening of bottom outlet valve assembly 30.

A method of assembling tanker railcar 10 includes providing at least one tank 12, at least one tank 12 defining a cavity, coupling a bottom outlet valve assembly 30 in flow communication to tank 12, the bottom outlet valve assembly facilitating release physical products, bottom outlet valve assembly 30 including a valve stem 32 (all shown in FIG. 1). The method also includes rotatably coupling a valve stem coupling 210 (shown in FIG. 11) to valve stem 32. The method further includes coupling at least one valve interlock bracket 240 (shown in FIG. 11) to tank 12. Each valve interlock bracket 240 includes a bracket collar 241 (shown in FIG. 13). Bracket collar 241 has a bracket face 243 (shown in FIG. 13). The method additionally includes coupling a valve operator assembly 220 (shown in FIG. 13) to valve interlock bracket 240. Valve operator assembly 220 is configured to facilitate the rotation of valve stem coupling 210 and valve stem 32. Valve operator assembly includes an operator handle 222 (shown in FIG. 11) and at least one bracing pin 228 (shown in FIG. 11) coupled to operator handle 222. Bracket collar 241 and at least one bracing pin 228 substantially prevent retraction of valve operator assembly 220 while bottom outlet valve assembly 30 is not in a substantially closed position.

As described herein, valve interlock system 200 is used to assemble tanker railcar 10. Alternatively, valve interlock system 200 may be used with alternative railcars to provide the benefits and effects described herein.

Figure 17:
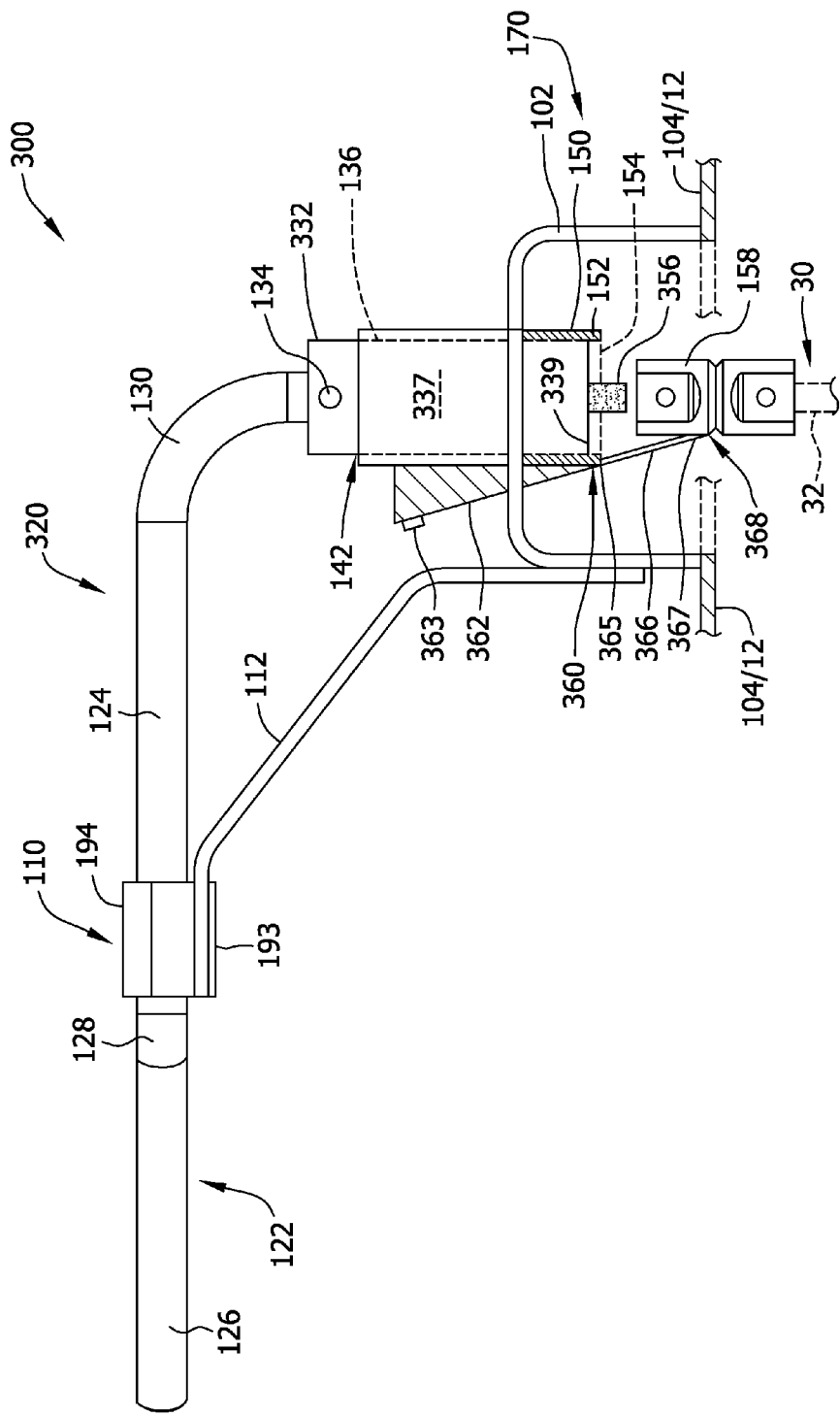
Figure 18:
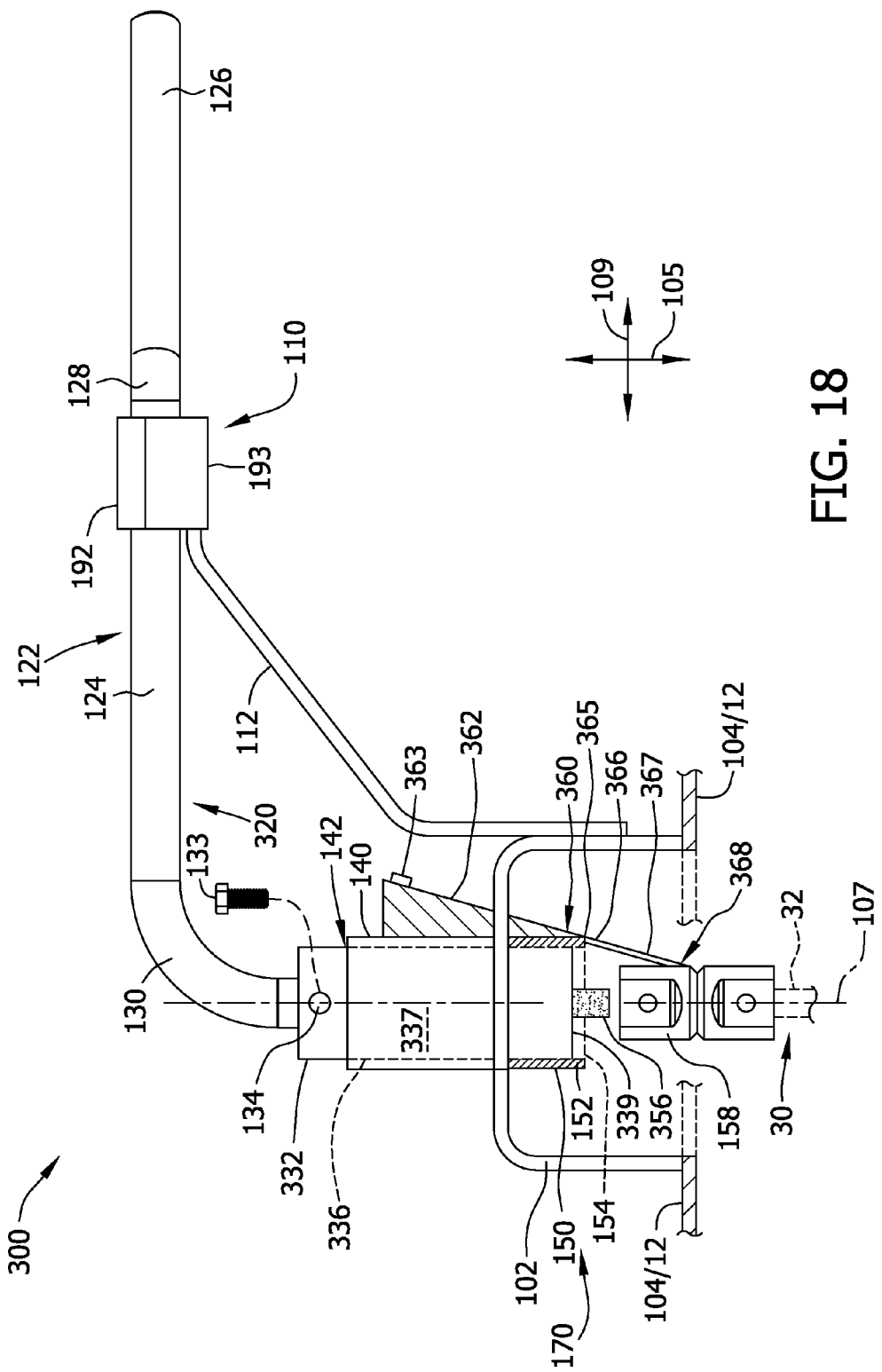

FIG. 17 is a schematic overhead view of an alternative valve interlock system 300 used with bottom outlet valve assembly 30. FIG. 18 is a schematic bottom view of valve interlock system 300. Valve interlock system 300 is similar to valve interlock system 100 (shown in FIGS. 3-5) with the following exceptions.

In this example embodiment, valve operator assembly 320 includes a rotatably translatable and longitudinally translatable body 332 coupled to bend portion 130 of operator handle 122 through fastener 133 removably inserted through fastener opening 134. Alternatively, body 332 is coupled to bend portion 130 through any means that enables operation of valve interlock system 300 and valve operator assembly 320 as described herein, including, without limitation, welding and unitary casting. Body 332 includes a base portion 336 that includes an outer surface 337. Body 332 does not include beveled portion 138 and beveled surface 139 (both shown in FIGS. 3 and 4). Rather, body 332 includes a substantially flat surface 339.

Valve operator assembly 320 also includes an operator extension 356 extending longitudinally inward from flat surface 339. In contrast to operator extension 156 (shown in FIGS. 3 and 4), operator extension 356 does not extend into valve stem coupling device 158 with valve operator assembly 320 in the "STOWED" and "OPEN" positions (shown in FIG. 5).

Moreover, in this example embodiment, valve interlock system 300 includes a valve stem locking subsystem 360. Rather than stationary support member 162 (shown in FIGS. 3 and 4), valve stem interlocking subsystem 360 includes a stationary support member 362 coupled to and extending from outer sleeve 140 and collar 150 through a mechanical fastener 363 In alternative embodiments, stationary support member 362 is coupled to outer sleeve 140 and collar 150 using any appropriate method of coupling including, for example, and without limitation, welding, brazing, and adhesives. Stationary support member 362 is wedge shaped and extends to transverse surface 154. Alternatively, stationary support member 362 has any configuration that enables operation of valve stem locking subsystem 360 and valve interlock system 300 as described herein.

Valve stem locking system 360 also includes a biasing device 366. Biasing device 366 includes a first end 365 coupled to stationary support member 362 and collar 150 proximate transverse surface 154 using any appropriate method of coupling including, for example, and without limitation, fasteners, welding, brazing, and adhesives. Biasing device 366 extends toward valve stem coupling device 158, and, in FIGS. 17 and 18, a second end 367 of biasing device 366 resides within a slot 368 defined in valve stem coupling device 158. In this example embodiment, biasing device 366 is a spring, and in particular, a flat spring. Alternatively, biasing device 366 is any device that induces sufficient bias to enable operation of valve interlock system 300 and valve stem locking subsystem 360 as described herein. Base portion 332 is configured to press against biasing device 366, thereby deforming biasing device 366. Valve stem locking subsystem 360 is described further below.

In the example embodiment, one stationary support member 362, one biasing device 366, and one slot 368 are shown and described. Alternatively, a plurality of such device arrangements are used for purposes of increased locking strength and redundancy, e.g., and without limitation, a symmetrical arrangement of these devices on the transversely opposite side with respect to valve stem coupling device 158.

FIG. 19 is a schematic view of valve stem locking subsystem 360 in a fully engaged state and valve stem rotation restriction subsystem 170 in a rotation restrictive state. FIG. 20 is a schematic view of valve stem locking subsystem 360 in a partially disengaged state and valve stem rotation restriction subsystem 170 in a rotation restrictive state transiting to a nonrestrictive state. FIG. 21 is a schematic view of valve stem locking subsystem 360 in a fully disengaged state and valve stem rotation restriction subsystem 170 in a rotation nonrestrictive state. FIG. 22 is a schematic view of valve stem locking subsystem 360 in a fully disengaged state and valve stem rotation restriction subsystem 170 in a rotation nonrestrictive state with valve stem coupling device 158 turned 90 degrees. Operation of valve stem rotation restriction subsystem 170 is described above.

Coupling device 158 defines engagement slot 368 thereon. In addition to engagement slot 368, valve stem locking subsystem 360 includes second end 367 of biasing device 366 inserted therein. Biasing device 366 is transversely translatable and complimentary with engagement slot 368. Second end 367 is positioned within engagement slot 368 and is held in place through an interference fit. Biasing device 366 is configured to increase an induced engagement bias (shown by arrow 378). As flat surface 339 advances longitudinally inward, as shown by longitudinal translation arrow 180, base portion 336 of translatable body 332, i.e., either or both of surfaces 337 and 339 deforms biasing device 366. As such, second end 367 is transversely translated away from engagement slot 368 as biasing device 366, i.e., flat spring 366 deforms as shown by deformation arrow 380. The increased engagement bias 378 due to deformation of biasing device 366 through valve stem locking subsystem 360 from the locked state to the unlocked state facilitates the return of subsystem 366 to the locked state upon retraction of flat surface 339 and reinsertion of second end 367 into engagement slot 368.

In some embodiments, biasing device 366 is configured to induce a snapping action to pull second end 367 from engagement slot 368 to facilitate attaining the unlocked state prior to opening operation of ball 35. In other embodiments, biasing device 366 is configured to induce a gradual exit of second end 367 from engagement slot 368 as base portion 336 of translatable body 332, i.e., surfaces 337 and 339 traverse in the direction of arrow 180. Alternatively, reintroduction of second end 367 into engagement slot 368 includes a snapping action to facilitate surety of reengagement thereof as base portion 336 traverses in the direction opposite of arrow 180. Alternatively, reintroduction of second end 367 into engagement slot 368 is gradual. Therefore, in the example embodiment, base portion 336 of longitudinally and rotatably translatable body 332 of valve operator assembly 320 regulates slot engagement bias 378 as a function of a longitudinal position of flat surface 339 and the spring constant of basing device 366.

In some embodiments, as operator extension 356 longitudinally extends into valve stem coupling device 158, extension 356 facilitates pushing second end 367 out of engagement slot 368. Also, in some embodiments, operator extension 356 at least partially blocks engagement slot 378 from receiving second end 367. As such, until ball 35 is fully closed and operator extension 356 is sufficiently withdrawn longitudinally from valve stem coupling device 158, valve stem locking subsystem 360 will not lock valve operator assembly 320 from operation.

The example methods and apparatus described herein overcome at least some disadvantages of known railcars by providing a valve interlock assembly to reduce the risk of the unintentional release of products from a railway tanker car. Specifically, the methods and apparatus described herein facilitate removal of a valve operator from a valve when the valve is in a closed position and also facilitate convenient stowing of the operator. The methods and apparatus described herein also facilitate a reduction in the cleaning, maintenance, and remediation associated with the unintended release of such products. The methods and apparatus described herein additionally reduce the risk of loss of such products during transit.

Example embodiments of a valve interlock assembly for a railcar and method of assembling/fabricating the same are described above in detail. The valve operator assembly and method are not limited to the specific embodiments described herein, but rather, components of apparatus and/or steps of the method may be utilized independently and separately from other components and/or steps described herein. For example, the valve operator assembly may also be used in combination with other railcar and associated assembly/fabrication methods, and are not limited to practice with only the railcar and assembly/fabrication methods as described herein.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A valve interlock system for use in a railcar, the railcar including a tank and a bottom outlet valve assembly coupled in flow communication with the tank, the tank substantially defining a tank cavity, the bottom outlet valve assembly configured to release product from the tank cavity, the bottom outlet valve assembly including a valve and a valve stem coupled to the valve and extending longitudinally therefrom, said valve interlock system comprising a valve stem locking subsystem comprising:
- a coupling device rotatably coupled to the valve stem, said coupling device defining an engagement slot thereon, said coupling device substantially stationary in the longitudinal direction and rotatably translatable about a longitudinal axis;
- a stationary support member extending toward said valve stem coupling device in a transverse direction substantially perpendicular to the longitudinal direction, said stationary support member defining a cavity proximate said coupling device;
- a locking member at least partially positioned within said cavity, said locking member transversely translatable and complimentary with said engagement slot;
- a biasing device at least partially positioned within said cavity, said biasing device coupled to said locking member and configured to increase an engagement bias as said locking member is transversely translated away from said engagement slot; and
- a valve operator assembly configured to rotate said coupling device and the valve stem to open and close the valve, said valve operator assembly comprising a longitudinally and rotatably translatable body configured to regulate the slot engagement bias as a function of a longitudinal position of said body.

2. The valve interlock system in accordance with claim 1, wherein said valve operator assembly further comprises:
- a valve operator bracket coupled to the tank; and
- an outer sleeve coupled to and extending longitudinally from said valve operator bracket, said outer sleeve and said valve operator bracket defining a body bore therein, said body bore configured to receive said body therein, and said outer sleeve and said valve operator bracket configured to facilitate transverse support for said body.

3. The valve interlock system in accordance with claim 2, wherein said stationary support member is coupled to said valve operator bracket.

4. The valve interlock system in accordance with claim 1, wherein said valve operator assembly further comprises an operator handle coupled to said body.

5. The valve interlock system in accordance with claim 4 further comprising a handle locking assembly coupled to the tank, wherein said handle locking assembly is configured to receive said operator handle and to substantially prevent said operator handle from moving when said handle locking assembly is in a locked position.

6. The valve interlock system in accordance with claim 5, wherein said handle locking assembly comprises:
- a handle locking bracket coupled to the tank, said handle locking bracket configured to receive said operator handle;
- a handle locking bracket support member coupled to said handle locking bracket and the tank; and
- a fastener configured to removably couple said operator handle to said handle locking bracket thereby substantially constraining said body from longitudinal motion.

7. The valve interlock system in accordance with claim 1, wherein said locking member is configured to translate from an engaged position with said engagement slot to a fully retracted position within said cavity as said body compresses said biasing device, wherein when said locking member is in the engaged position said coupling device is substantially restricted from rotation, and when said locking member is in the fully retracted position, said coupling device is permitted to rotate.

8. The valve interlock system in accordance with claim 7, wherein said locking member and the valve stem of the bottom outlet valve assembly are interlocked such that the valve is in a substantially closed position when said locking member is in the engaged position.

9. The valve interlock system in accordance with claim 1, wherein said biasing device is a spring device.

10. The valve interlock system in accordance with claim 9, wherein said spring device is one of a leaf spring and a flat spring.

11. A valve interlock system for use in a railcar, the railcar including a tank and a bottom outlet valve assembly coupled in flow communication with the tank, the tank substantially defining a tank cavity, the bottom outlet valve assembly configured to release product from the tank cavity, the bottom outlet valve assembly including a valve and a valve stem coupled to the valve and extending longitudinally therefrom, said valve interlock system comprising a valve stem rotation restriction subsystem comprising:
- a longitudinally and rotatably translatable body comprising:
  - an outer surface extending about a longitudinal axis; and
  - a rotation restriction device coupled to and extending transversely from said outer surface; and
- a collar partially extending about said body, wherein said collar and said rotation restriction device are configured to permit longitudinal translation of said body only while the bottom outlet valve is in a substantially closed position and allow rotational translation of said body only while said body is substantially fully inserted longitudinally.

12. The valve interlock system in accordance with claim 11, wherein said collar is substantially arcuate in shape.

13. The valve interlock system in accordance with claim 11, wherein said collar comprises a longitudinal surface configured to contact said rotation restriction device such that longitudinal translation of said body is permitted and rotational translation of said body is substantially restricted until said body is substantially fully inserted longitudinally.

14. The valve interlock system in accordance with claim 11 wherein said collar comprises a transverse surface configured to contact said rotation restriction device when said body is substantially fully inserted longitudinally such that longitudinal translation of said body is substantially restricted and rotational translation of said body permitted.

15. The valve interlock system in accordance with claim 11 further comprising a valve operator assembly configured to rotate said body and the valve stem to open and close the valve, wherein said valve operator assembly comprises an operator handle coupled to said body.

16. The valve interlock system in accordance with claim 15 further comprising a handle locking assembly coupled to the tank, wherein said handle locking assembly is configured to receive said operator handle and to substantially prevent said operator handle from moving when said handle locking assembly is in a locked position.

17. The valve interlock system in accordance with claim 16, wherein said handle locking assembly comprises:
- a handle locking bracket coupled to the tank, said handle locking bracket configured to receive said operator handle;
- a handle locking bracket support member coupled to said handle locking bracket and the tank; and
- a fastener configured to removably couple said operator handle to said handle locking bracket thereby substantially constraining said body from longitudinal motion.

18. The valve interlock system in accordance with claim 17, wherein said rotation restriction device substantially restricts retracting said valve operator from said handle locking.

19. A railcar comprising:
- a tank substantially defining a tank cavity;
- a bottom outlet valve assembly coupled in flow communication to said tank, said bottom outlet valve assembly configured to release product from said tank cavity, said bottom outlet valve assembly including a valve and a valve stem coupled to said valve and extending longitudinally therefrom; and
- a valve interlock system comprising a valve stem locking subsystem comprising:
  - a coupling device rotatably coupled to said valve stem, said coupling device defining an engagement slot thereon, said coupling device substantially stationary in the longitudinal direction and rotatably translatable about a longitudinal axis;
  - a stationary support member extending toward said valve stem coupling device in a transverse direction substantially perpendicular to the longitudinal direction, said stationary support member defining a cavity proximate said coupling device;
  - a locking member at least partially positioned within said cavity, said locking member transversely translatable and complimentary with said engagement slot;
  - a biasing device at least partially positioned within said cavity, said biasing device coupled to said locking member and configured to increase an engagement bias as said locking member is transversely translated away from said engagement slot; and
  - a valve operator assembly configured to rotate said coupling device and said valve stem to open and close said valve, said valve operator assembly comprising a longitudinally and rotatably translatable body configured to regulate the slot engagement bias as a function of a longitudinal position of said body.

20. The railcar in accordance with claim 19, wherein said body comprises an outer surface extending about a longitudinal axis and a rotation restriction device coupled to and extending transversely from said outer surface, said valve interlock system further comprises a valve stem rotation restriction subsystem comprising a collar partially extending about said body, wherein said collar and said rotation restriction device are configured to permit longitudinal translation of said body only while said bottom outlet valve is in a substantially closed position and allow rotational translation of said body only while said body is substantially fully inserted longitudinally.

* * * * *